US009033781B2

(12) United States Patent
Steir et al.

(10) Patent No.: US 9,033,781 B2
(45) Date of Patent: May 19, 2015

(54) DESIGNING A REAL SPORTS COMPANION MATCH-PLAY CROWDSOURCING ELECTRONIC GAME

(71) Applicant: Mindforce Consulting, LLC, New York, NY (US)

(72) Inventors: Robert Craig Steir, New York, NY (US); Michael Scott Brewster, Brooklyn, NY (US); Avinash Viswanath Ambale, Boston, MA (US)

(*) Notice: Subject to any disclaimer, the term of this patent is extended or adjusted under 35 U.S.C. 154(b) by 36 days.

(21) Appl. No.: 13/729,947

(22) Filed: Dec. 28, 2012

(65) Prior Publication Data

US 2013/0184039 A1  Jul. 18, 2013

Related U.S. Application Data

(60) Provisional application No. 61/631,277, filed on Dec. 30, 2011.

(51) Int. Cl.
G06F 17/00 (2006.01)
A63F 13/00 (2014.01)
A63F 13/30 (2014.01)

(52) U.S. Cl.
CPC ............... *A63F 13/00* (2013.01); *A63F 13/12* (2013.01); *A63F 2300/6009* (2013.01); *A63F 2300/69* (2013.01); *A63F 2300/8052* (2013.01)

(58) Field of Classification Search
CPC .............................................. A63F 2300/6009
USPC .................... 463/1–10, 16, 3.1–35, 31–35
See application file for complete search history.

(56) References Cited

U.S. PATENT DOCUMENTS

| 2006/0046807 A1* | 3/2006 | Sanchez | 463/9 |
| 2010/0259005 A1* | 10/2010 | Simon | 273/292 |
| 2012/0129610 A1* | 5/2012 | Mazursky et al. | 463/42 |
| 2013/0079128 A1* | 3/2013 | Thomas et al. | 463/30 |
| 2013/0281188 A1* | 10/2013 | Guinn et al. | 463/25 |

* cited by examiner

*Primary Examiner* — Ronald Laneau
(74) *Attorney, Agent, or Firm* — GTC Law Group LLP & Affiliates

(57) ABSTRACT

Developing a match-play game in which an outcome of a live event determines an outcome within the match-play game comprises several steps including determining a set of outcomes that may occur in the live event, presenting the set of outcomes to a game designer, presenting a design interface in which a game designer may create a match-play game, enabling a user to determine a set of outcomes that may occur in the match-play game, and enabling the user to associate at least one outcome in the match-play game to an outcome in the live event.

20 Claims, 44 Drawing Sheets

Developing The Competition Module step 508 — 502 Define Crowd, Groups and Individual Player Competitions step 510 — 504 Define The Opponents Of The Games; How Crowd, Groups and Individuals Play Each Other In These Contests step 512 — 506 Define When Crowd, Groups and Individuals Compete

FIG. 5

Potential Competitive Module Framework Outcomes

|   |   |   |   |
|---|---|---|---|
| 702 → 602, 614, 618 | | 606, 616, 618 | ← 706 |
| 602, 614, 620 | 602, 616, 618 | 606, 616, 620 | |
| 602, 614, 622 | 602, 616, 620 | 606, 616, 622 | |
| | 602, 616, 622 | | |
| 604, 614, 618 | | | |
| 604, 614, 620 | 704 → 604, 616, 618 | | |
| 604, 614, 622 | 604, 616, 620 | | |
| | 708 → 604, 616, 622 | | |
| 608, 614, 618 | | | |
| 608, 614, 620 | 608, 616, 618 | | |
| 608, 614, 622 | 608, 616, 620 | | |
| | 608, 616, 622 | | |
| 610, 614, 618 | | | |
| 610, 614, 620 | 610, 616, 618 | | |
| 610, 614, 622 | 610, 616, 620 | | |
| | 610, 616, 622 | | |
| 612, 614, 618 | | | |
| 612, 614, 620 | 612, 616, 618 | | |
| 612, 614, 622 | 612, 616, 620 | | |
| | 612, 616, 622 | | |

FIG. 7

Baseball Game Framework Overview
For Competitive Module and Game Play Module

| Overview Of Game Play | BASEBALL |
|---|---|
| 502 Define Crowd, Groups and Individual Player Competitions | 1 player vs. 1 player     group vs. crowd<br>1 player vs. group        crowd vs. crowd<br>1 player vs. crowd        group vs. group |
| 504 Define The Opponents Of The Games; How Crowd, Groups and Individuals Play Each Other In These Contests | Play Against Same Team<br>Play Against Opposing Teams |
| 506 Define When Crowd, Groups and Individuals Compete; | Make predictions based on offense selections and defensive selections |
| 802 Determine The Match-play Duration: Start And Finish | 2 Inning Games<br>8 Inning Games for Crowd vs. Crowd |
| 810 Define Match-Play Game Scoring | Individual vs. Individual : Cumulative Scoring<br>Involving Group or Crowd: Normalized or "wisdom of crowd" |
| 804 Determine Game Play Selections | For At-Bat Offense: Type of Hit; or Type of Hit and Fielder<br>For In-The-Field Defense: Type of Out; Type of Out and Fielder; or Type of Hit and Fielder |
| 806 Define How Individual or Multiple Game Play Selections Are Chosen By Players As Prediction | Multiple selections of hit or out based on at-bat or in-the-field player – using Win-Place-Show selections |
| 808 Define Game Play Points For Individual Selections And Multiple Selections | Based on the win-place-show concept where probability of one or two or three combinations (i.e. the prediction) are used for points to be awarded, plus bonus actions; |

FIG. 9

Hockey Game Framework Overview For Competitive Module and Game Play Module

| Overview of Game Play | HOCKEY |
|---|---|
| 502 Define Crowd, Groups And Individual Player Competitions For All Match-play Games | Single Player vs. Single Player<br>Single Player vs. Crowd |
| 504 Define The Opponents Of The Games – Playing For Same Team Or Against Opposing Team In Real Game | Play For Same Team Only |
| 506 Define When Crowd, Groups And Individuals Compete – On Offense, Defense, Or Both Offense Or Defense | Make predictions based on offense selections and defensive selections |
| 802 Determine The Match-play Duration: Start And Finish Of The Game | Individual Games: Two 6-Minute Sections of a 10 Minute Game. Start of period to 10 minutes, then last 10 minutes to end of period.<br><br>Crowd Games: Entire game from start of $1^{st}$ period to end of $3^{rd}$ Period. Use same 5 Minute Sections, similar to innings in baseball game |
| 810 Define Match-play Game Scoring For Two Opponents For The Entire Duration Of The Match-play Game | In individual games, when a set margin of different in points between two opponents after the 5 minutes equates to a goal scored. If 10 points= 1 goal, then 20 points = 2 goals. |
| 804 Determine Game Play Selections To Be Used To Make Predictions | See FIG . 29 for sample list |
| 806 Define How These Game Play Selections Can Be Combined In Individual Or Multiple Combinations To Be Used As The Predictions | Based on action item; Based on player performing action item – occur within 5 minute session. |
| 808 Define Game Play Points For These Individual Selections And Multiple Combinations For Correct Predictions | Individual selections score points<br>Can have multiple selections, like win-place-show, that score points |
| Define Bonus Actions | Will goal be scored during 5 minutes by team, or by other team? Different points based on time remaining |

FIG. 10

Football Game Framework Overview
For Competitive Module and Game Play Module

| Overview of Game Play | FOOTBALL |
|---|---|
| 502 Define Crowd, Groups And Individual Player Competitions For All Match-play Games | 2 players vs. 2 players;  group vs. group<br>1 player vs. 1 player  group vs. crowd<br>1 player vs. group  crowd vs. crowd<br>1 player vs. crowd |
| 504 Define The Opponents Of The Games – Playing For Same Team Or Against Opposing Team In Real Game | Play Against Same Team<br>Play Against Opposing Teams |
| 506 Define When Crowd, Groups And Individuals Compete – On Offense, Defense, Or Both Offense Or Defense | Make predictions based on offense selections and defensive selections |
| 802 Determine The Match-play Duration: Start And Finish Of The Game | 1 Half 2 sections)<br>Entire 4 Quarters 4 sections) |
| 810 Define Match-play Game Scoring For Two Opponents For The Entire Duration Of The Match-play Game | Cumulative Points (normalized for groups and crowd) or Conversion Points System (also normalized for groups and crowd) with coach installed. |
| 804 Determine Game Play Selections To Be Used To Make Predictions | See FIG.'s 33; Fig 34; Fig 35 |
| 806 Define How These Game Play Selections Can Be Combined In Individual Or Multiple Combinations To Be Used As The Predictions | For both Defense and Offense, players select one or more selections from a number of categories. The prediction made (combines each of the selection options in an "and" statement. |
| 808 Define Game Play Points For These Individual Selections And Multiple Combinations For Correct Predictions | Points are awarded in two ways: Based on the win-place-show concept where probability of one or two or three combinations (i.e. the prediction) are used for points to be awarded, plus bonus actions; or a 3 step program where one point is awarded for correct prediction and player can add bonus actions and a section-based multiplier. |

FIG. 11

Cricket Match Framework Overview
For Competitive Module and Game Play Module

| Overview of Game Play | CRICKET |
|---|---|
| 502 Define Crowd, Groups and Individual Player Competitions | 1 player vs. 1 player    group vs. crowd<br>1 player vs. group     crowd vs. crowd<br>1 player vs. crowd     group vs. group |
| 504 Define The Opponents Of The Games; How Crowd, Groups and Individuals Play Each Other In These Contests | Play Against Same Team<br>Play Against Opposing Teams |
| 506 Define When Crowd, Groups and Individuals Compete; | Make predictions based on batting selections and fielding selections |
| 802 Determine The Match-play Duration: Start And Finish | Entire duration of a Test match spanning over 5 days 3 sessions a day)<br>2 innings of 50 Over's each<br>2 innings of 20 Over's each |
| 810 Define Match-Play Game Scoring | Individual vs. Individual : Cumulative Scoring<br>Involving Group or Crowd: Normalized or "wisdom of crowd" |
| 804 Determine Game Play Selections | See FIG.'s 39 and 40<br>For Batsman: Type of Shot; or Type of Shot and Fielder<br>For Fielders : Type of Out; Type of Out and Fielder; or Type of Shot and Fielder |
| 806 Define How Individual or Multiple Game Play Selections Are Chosen By Players As Prediction | Multiple selections of shot or out based on batsman or fielding player – using Win-Place-Show selections |
| 808 Define Game Play Points For Individual Selections And Multiple Selections | Based on the win-place-show concept where probability of one or two or three combinations (i.e. the prediction) are used for points to be awarded, plus bonus actions; |

FIG. 12

Baseball Game Representation- Competition Module Examples

| Competitive Game Examples | Selections | Example |
|---|---|---|
| One player against another player in a two-inning game, where players play for different teams, when their "live" team is at-bat and in-the-field | 1802, 1816, 1818 | 1 Mets player M123 against 1 Yankees Y121 player in a two-inning game between Mets and Yankees. They play during the same 3rd and 4th innings. Y121 also plays simultaneously against M124 |
| One player against a group of players in a two-inning where players play for same team, when "live" team is at-bat and in-the-field | 1804, 1814, 1818 | 1 Mets player M123 against all the players who play for Bar123 where 10 players are playing for the Mets. Each Mets player in the bar can play against Bar 123. They play during the same 3rd and 4th innings |
| One player against a group of players in a two-inning game, where players play for different teams, when their "live" team is at-bat and in-the-field, | 1804, 1816, 1818 | 1 Mets player M123 in Bar123 is playing against all the players who play for Bar124 10 players are playing for the Yankees). Each Mets player in the bar can play against Bar 123 as a group. They play during the same 3rd and 4th innings |
| All the players on one team against all the players on the other team, where players play for the same team in an 8 inning game, when "live" team is at-bat and in-the-field | 1812, 1816, 1818 | All the Mets players M001 to M312 (312 players) combine to form the Mets Crowd Team. They play an 8 inning game against all the Yankees players Y001 to y1453 (1453 players) |

FIG. 19

Baseball Game Representation- Rotate "Live" Team as At-Bat Players and In-The-Field Players Home Team As P2 and Visitor as P1

| Top Of Inning | 1 | 2 | 3 | 4 | 5 | 6 | 7 | 8 |
|---|---|---|---|---|---|---|---|---|
| At-Bat | P1 | P2 | P1 | P2 | P1 | P2 | P1 | P2 |
| In Field | P2 | P1 | P2 | P1 | P2 | P1 | P2 | P1 |

| Bottom of Inning | 1 | 2 | 3 | 4 | 5 | 6 | 7 | 8 |
|---|---|---|---|---|---|---|---|---|
| At-Bat | P2 | P1 | P2 | P1 | P2 | P1 | P2 | P1 |
| In Field | P1 | P2 | P1 | P2 | P1 | P2 | P1 | P2 |

FIG. 22

Baseball Game Representation- Competition Module

Example Of Game Play Point System For At-Bat Player Based on Probability of Occurrence

| Possible Outcomes ( | Points | Penalty Points If Wrong |
|---|---|---|
| Home Run (Left Field Bleachers) | 30 | 0 |
| Single (ground ball past 1st baseman) | 15 | 0 |
| Single (ground ball past 3rd baseman)<br>Double (line drive to right fielder) | 10 | 1 |
| Single (ground ball past 3rd baseman)<br>Double (line drive to center fielder)<br>Triple (to right fielder) | 8 | 1 |
| Single (line drive to left fielder)<br>Double (line drive to left fielder)<br>Triple (line drive to center fielder)<br>Home Run (left field bleachers) | 5 | 2 |

FIG. 23

Baseball Game Representation- Rewards Program Example

| During A 2-Inning Game For Play 1: Achievements, Actions, Results | Prize Points | Bonus Points |
|---|---|---|
| Win 1 vs. 1 game between two individual players | 10 | 1 |
| Correct Trivia Questions 1 point if correct, 0 for guessing) | 1 | 0 |
| Top 10% in Game Play Points In Two-Inning 1 vs 1 Game between two individual players | 5 | 1 |
| Total Won | 16 | 2 |

FIG. 24

Baseball Game Representation- Bonus Action Examples

|  | Double Down | RBI | Hunch |
|---|---|---|---|
| Cost In Reward Bonus Points | 3 | 1 | 5 |
| Game Play Points Reward If Correct | Double Existing | Up to 2 | 1.5x to 10x multiple of 5 depending |
| Game Play Points Penalty If Incorrect | Double Existing | 0 | Loss of Reward Bonus Points |

FIG. 25

Hockey Game Representation: Match-play Game Durations

| | PERIOD 1 | | PERIOD 2 | | PERIOD 3 | |
|---|---|---|---|---|---|---|
| 10 MINUTE GAMES | GAME 1 | GAME 2 | GAME 3 | GAME 4 | GAME 5 | GAME 6 |
| | 5  5 | 5  5 | 5  5 | 5  5 | 5  5 | 5  5 |

FIG. 28

Hockey Game Representation
Selections Based On Elements of the Game Play

| [A] ELEMENT | [B] QUANTITY | [C] WHO |
|---|---|---|
| Shots on Goal | >6 | Player A #2<br>Player B #1 |
| Goals Scored | =1 | Player A |
| Block Shots | >2 | Player D #1<br>Player E #1 |
| Penalties | 0 | |
| Face Off's Won | >4 | |
| Goals Scored By Opponent | 0 | 0 |
| | | |

FIG. 29

Hockey Game Representation
Selection Options For Shots On Goal
During 1st Period 0-5 Minutes

| Formula Options For Prediction | B + C<br>B or C<br>B only<br>C only |
|---|---|

| [B] QUANTITY | [C] WHO |
|---|---|
| B1< 5 | C1= Player A |
| B2= any number | C2= Player A Player B |
| B3=>3 | C3= Player A Player B Player C |
| B4>3 | C4= A OR B OR C |
| B5>6 | C5= 2 OF A, B, C, D, E, F |

| Sample Prediction Combinations | Points | These Selections Must Occur To Be Correct |
|---|---|---|
| #1 | 10 | B2=8 and C3 (all players) |
| #2 | 5 | B5 AND C1 |
| #3 | 3 | B5 |
| #4 | 1 | C1 |
| #5 | 3 | B4 or C5 |
| #6 | 1 | C4 |
| ...N | | |

FIG. 30

Football Game Representation: Match-play Game Durations

| 1ST Quarter | 2nd Quarter | 3rd Quarter | 4th Quarter |
|---|---|---|---|
| Game 1 (30 Minutes) | | Game 2 (30 Minutes) | |
| 15 minutes | 15 minutes | 15 minutes | 15 minutes |
| Game 3 60 minutes) | | | |
| 15 minutes | 15 minutes | 15 minutes | 15 minutes |

FIG. 32

Football Game Representation
Offensive Player Selections Before A Play Starts With QB (or the person who takes the snap)

3302  3304

| Actual Outcome of the Play | a position player doing the outcome |
|---|---|
| Run | By running back |
|  | By wide receiver |
|  | By quarterback |
| Completed Pass | To running back |
|  | To wide receiver |
|  | To tight end |

3306  3308

| The Number of Yards Gained/Lost Of Play's Outcome | The Direction of the play (where tackle made) |
|---|---|
| 0-5 | To left of left hash-mark |
|  | To middle between left and right hash-marks |
|  | To right of right hash mark |
| 5-10 | To left of left hash-mark |
|  | To middle between left and right hash-marks |
|  | To right of right hash mark |
| 10-20 | To left of left hash-mark |
|  | To middle between left and right hash-marks |
|  | To right of right hash mark |
| 20+ | To left of left hash-mark |
|  | To middle between left and right hash-marks |
|  | To right of right hash mark |

FIG. 33

Football Game Representation
Defensive Team Selections Before A Play Starts With QB (or the person who takes the snap)

| Actual Outcome of the Play | a position player doing the outcome |
|---|---|
| Run | By running back |
| | By wide receiver |
| | By quarterback |
| Completed Pass | To running back |
| | To wide receiver |
| | To tight end |
| Incomplete Pass | To running back |
| | To wide receiver |
| | To tight end |
| | To No One In Particular |
| Sack | By Defensive End |
| | By Linebacker |
| | By Defensive Back |
| Interception | By Defensive End |
| | By Linebacker |
| | By Defensive Back |

3402

3404

| The Number of Yards Gained/Lost Of Play's Outcome | The Direction of the play (where tackle made) |
|---|---|
| Negative, Zero or Incomplete Pass | To left of left hash-mark |
| | To middle between left and right hash-marks |
| | To right of right hash mark |
| 0.1-5 | To left of left hash-mark |
| | To middle between left and right hash-marks |
| | To right of right hash mark |
| 5-10 | To left of left hash-mark |
| | To middle between left and right hash-marks |
| | To right of right hash mark |
| 10-20 | To left of left hash-mark |
| | To middle between left and right hash-marks |
| | To right of right hash mark |
| 20+ | To left of left hash-mark |
| | To middle between left and right hash-marks |
| | To right of right hash mark |

Football Game Representation: Selections For Other Plays

For Offensive Player - Field Goal Attempt

| Actual Outcome of the Play | Hit The Net At Back of End Zone |
|---|---|
| Made | Yes OR No |
| Miss | Yes OR No |
| Block | No |

For Offensive Player - Punter taking snap on 4th down

| Actual Outcome of the Play | The number of "net" yards after return by punt returner | The direction of the play (where tackle made) |
|---|---|---|
| Punt | 50+ | To left of left hash-mark |
| | 40 to 50 | To middle between left and right hash-marks |
| | 30 to 40 | To right of right hash mark |
| | 20 to 30 | |
| | 0 to 20 | |
| | Negative | |
| Fake Punt/ Bad Snap | 10+ Gain | To left of left hash-mark |
| | 0 to 10 Gain | To middle between left and right hash-marks |
| | Negative/Loss | To right of right hash mark |

For Offensive Player - Returning Kickoff

| Actual Outcome of the Kickoff |
|---|
| Touchback |
| First down starting before 10 yard line |
| First down starting between 10 and 35 yard line |
| Starting after 35 yard line |
| Onside Kick |

For Defensive Player - Field Goal Attempt

| Actual Outcome of the Play | Hit End Zone At Back of End Zone |
|---|---|
| Made | Yes or No |
| Miss | Yes or No |
| Block | No |

For Defensive Player - Punter taking snap on 4th down

| Actual Outcome of the Play | the number of "net" yards after return by punt returner | the direction of the play (where tackle made) |
|---|---|---|
| Punt | 50+ | To left of left hash-mark |
| | 40 to 50 | To middle between left and right hash-marks |
| | 30 to 40 | To right of right hash mark |
| | 20 to 30 | |
| | 0 to 20 | |
| | Negative | |
| Fake Punt/ Bad Snap | 10+ Gain | To left of left hash-mark |
| | 0 to 10 Gain | To middle between left and right hash-marks |
| | Negative/ Loss | To right of right hash mark |
| Block Punt | Negative | To left of left hash-mark |
| | Positive | To middle between left and right hash-marks |
| | | To right of right hash mark |

For Defensive Player - Defending The Kickoff

| Actual Outcome of the Kickoff |
|---|
| Touchback |
| First down starting before 10 yard line |
| First down starting between 10 and 35 yard line |
| Starting after 35 yard line |
| Onside Kick |

FIG. 35

Football Game Representation: Scoring For Each Prediction Play 3 step Process

Cricket Match Representation: Start Of Game Player Representation

3702 Player representation for Test Match Cricket

| Innings | FTP | BTP |
|---|---|---|
| First innings (Top) | Player 1 | Player 2 |
| First innings (Bottom) | Player 2 | Player 1 |
| Second innings (Top)* | Player 1 | Player 2 |
| Second innings (Bottom)* | Player 2 | Player 1 |

* Innings order may change in case of follow-on

3704 – Player representation for One Day International Cricket

| Innings | FTP | BTP |
|---|---|---|
| First innings | Player 1 | Player 2 |
| Second innings | Player 2 | Player 1 |

3706 – Player representation for Twenty 20 Cricket

| Innings | FTP | BTP |
|---|---|---|
| First innings | Player 1 | Player 2 |
| Second innings | Player 2 | Player 1 |

FIG. 37

Cricket Match Representation: Batting Team Player Outcome And Selections

3902 Batting team player outcome selections

3904 Batting team player shot selections

| OUTCOME | "FIELDER" WHERE BALL HIT |
|---|---|
| No Run Scored<br>1 Run Scored<br>2 Runs Scored<br>3 Runs Scored<br>4 Runs Scored<br>5 Runs Scored<br>6 Runs Scored | Wicketkeeper<br>Slip<br>Gully<br>Third Man<br>Fine Leg<br>Point<br>Square leg<br>Cover<br>Mid-on(Long on)<br>Mid-off(Long-off)<br>Mid-wicket<br>Bowler<br>Boundary<br>Extras |

Shot/ Defense

FIG. 39

Cricket Match
Representation
Fielding Team
Player (Ftp)
Outcome And
Selections

| | 4202 Fielding team player outcome selections | 4004 Fielding team player shot selections |
|---|---|---|
| | OUTCOMES | "FIELDER" WHERE BALL HIT |
| Shot/ Defense | No Run Scored<br>1 Run Scored<br>2 Runs Scored<br>3 Runs Scored<br>4 Runs Scored<br>5 Runs Scored<br>6 Runs Scored | Wicketkeeper<br>Slip<br>Gully<br>Third Man<br>Fine Leg<br>Point<br>Square leg<br>Cover<br>Mid-on(Long on)<br>Mid-off(Long-off)<br>Mid-wicket<br>Bowler<br>Boundary<br>Extras |
| OUT | Caught Out<br>Bowled Out<br>Run Out<br>Out Handling the ball<br>Out Hit Wicket<br>Out LBW<br>Out Stumped<br>Out Obstructing the field | Ball Hit to Wicketkeeper<br>Ball Hit to Slip<br>Ball Hit to Gully<br>Ball Hit to Third Man<br>Ball Hit to Fine Leg<br>Ball Hit to Point<br>Ball Hit to Square leg<br>Ball Hit to Cover<br>Ball Hit to Mid-on(Long on)<br>Ball Hit to Mid-off(Long-off)<br>Ball Hit to Mid-wicket<br>Ball Hit to Bowler<br>Ball Hit to Boundary |

FIG. 40

Cricket Match Representation -- Inning Multiplier (Example)

Wicketkeeper – 1.7
Slip – 1.0
Gully – 1.0
Third Man – 1.5
Fine Leg – 1.0
Point – 1.8
Square leg – 1.0
Cover – 1.0
Mid-on(Long on) – 1.0
Mid-off(Long-off) – 1.2
Mid-wicket – 1.6
Bowler – 1.9

FIG. 43

Cricket Match Representation -- Points Handling

A) First Innings. 1st Batsman:
Player 1 is BTP; Player 2 is FTP.
Outcome: On the bowled ball, the batsman played towards cover
Points Awarded:
- FTP: Yes. ITFP correctly selected played towards cover.
- BTP: No. Penalty Fee.

|  | BTP | | | FTP | | |
|---|---|---|---|---|---|---|
|  | Selection | D D | T D | Selection | D D | T D | Action Outcome |
| Before the ball is bowled | Shot towards long on | | | Shot towards cover | | | Shot towards cover |

B) First Innings. 2nd Batsman:
Player 1 is BTP; Player 2 is FTP
Outcome: On the bowled ball, the batsman is caught by the wicket keeper.
Points Awarded:
- ITFP: No.
- ABP: No.

|  | BTP | | | FTP | | |
|---|---|---|---|---|---|---|
|  | Selection | D D | T D | Selection | D D | T D | Action Outcome |
| Before the ball is bowled | Shot towards long on | | | Shot towards cover | | | Batsman is caught by the wicket keeper |

FIG. 44

DESIGNING A REAL SPORTS COMPANION MATCH-PLAY CROWDSOURCING ELECTRONIC GAME

CROSS-REFERENCE TO RELATED APPLICATIONS

This application claims the benefit of the following provisional patent application, which is hereby incorporated by reference herein in its entirety: U.S. Provisional Patent Application Ser. No. 61/631,277 filed Dec. 30, 2011.

BACKGROUND

1. Field

The methods and systems of game design relate to prediction-related game play.

2. Description of the Related Art

Massively multiplayer online games have been around since the early 1970s and stem from role-playing games such as Dungeons and Dragons. Until recent advancements in Internet speeds and accessibility into homes and to/from mobile devices, multiplayer games focused on virtual worlds, such as World of Warcraft and Everquest II, and were mostly played via a networked computer. Fast forward to today's world, where vast increases in computational, memory storage, and interactive capabilities of Smartphone and Tablets have allowed companies like Zynga and Apple to develop multiplayer mobile applications that allow players to play other individuals and groups in real-time.

At the same time, the sports industry has been expanding into providing huge amounts of data. Player and match statistics from past and current U.S. sports leagues, such as the NFL and MLB, are being used to allow players to play in fantasy leagues. In these leagues, consumers, using software provided to them, act as participants in a defined league, and draft a roster of active players to play during the weekly sports contests, most popularly the NFL.

Since the proliferation of electronic entertainment devices and mobile communication devices, the public's thirst for real-time, up-to-date access to "live sporting events" has been increasing. The increase Consumer and B2B web sites that provide up-to-the-minute player, team and competitive match statistics have added to this demand. For the fans who need to be "in the know," especially about their team, there are web sites that cater to them.

SUMMARY

Since the proliferation of IOS and Android apps available for Smartphones and tablets, the opportunity to watch TV and simultaneously use a second screen for other purposes has skyrocketed. This usage is predicted to rapidly grow as more and more people in their homes have fast-streaming Internet connectivity and access to Wi-Fi for these second screens.

Given the rise of second screens, the use of them for looking at professional sporting contests, such as baseball and football, has equally grown, mainly as a way for one individual to view stats and see how his or her fantasy players are doing, usually in real-time. The opportunity exists, however, to go beyond the design for one person's experience, and offer a design methodology and system for multiplayer games, around real-time games of professional sports leagues, that simultaneously engage users, as both individuals and as a crowd of participants. These constructed games can be designed, using a set series of attributes, to create different game plays (points, reward programs, gamification rules and regulations) that can allow both individuals and the crowd to predict the outcome of a play, or plays, as they watch a game in real-time. These games, created by using the same game design process, will yield different game applications that incorporate and encourage multiplayer/crowd involvement and individual and team/crowd competition and components of game play—all based on the predicted next play and the results of the play—and results over all the plays in a real-time game (part of or in its entirety). The invention disclosed aims to address this need.

The methods and systems of game design disclosed herein may include a method of developing a match-play game in which an outcome of a live event determines an outcome within the match-play game. The method may include several steps, such as: i) determining a set of outcomes that may occur in the live event; ii) presenting the set of outcomes to a game designer; iii) presenting a design interface in which a game designer may create a match-play game; iv) enabling a user to determine a set of outcomes that may occur in the match-play game; and v) enabling the user to associate at least one outcome in the match-play game to an outcome in the live event. This method may further include providing the user with a probability of occurrence of an outcome in the live event, such that the associating of an outcome in the match-play game to an outcome of the live event may be based on the probability of occurrence of the outcome in the live event. This method may further include providing the user with a point value for an outcome in the live event, such that the associating of an outcome in the match-play game to an outcome of the live event may be based on the point value of the outcome in the live event. In this method, enabling a user to associate at least one outcome in the match-play game to an outcome in the live event includes enabling the user to predict at least one outcome of the live event. In this method, enabling the user to predict at least one outcome of the live event includes enabling the user to predict at least one measureable action of at least one real play event of the live event. In this method, the live event is a live sports event. In this method, the live sports event is one of a hockey game, a football game, a baseball game, and a cricket game. This method may further include enabling the user to associate a plurality of outcomes in the match-play game to a plurality of time-separated outcomes in the live event.

The methods and systems of game design disclosed herein may include developing a match-play game in which player predictions of live event outcomes determines a match-play winner within the match-play game. The method may include several steps, such as: i) determining a set of outcomes that may occur in the live event; ii) presenting the set of outcomes to a game designer; iii) presenting a design interface in which a game designer may create a match-play game; iv) enabling a user to select one or more outcomes from the set of outcomes that may occur in the live event as outcome predictions in the match-play game; and v) enabling determination of a match-play winner based on comparison of the outcome predictions with actual outcomes of the live event. In this method, the live event is a live sports event. In this method, the live sports event is one of a hockey game, a football game, a baseball game, and a cricket game.

The methods and systems of game design disclosed herein may include developing a match-play game in which competing player predictions of a live event outcome determines a match-play winner within the match-play game. The method may include several steps, such as: i) determining a set of outcomes that may occur in the live event; ii) presenting the set of outcomes to a game designer; iii) presenting a design interface in which a game designer may create a match-play game for at least two competing players; iv) enabling each competing player to select one or more outcomes from the set of outcomes that may occur in the live event as player-specific outcome predictions in the match-play game; and v) enabling determination of a match-play winner based on comparison of each player-specific outcome prediction with actual outcomes of the live event. In this method, the live event is a live sports event. In this method, the live sports event is one of a hockey game, a football game, a baseball game, and a cricket game.

The methods and systems of game design disclosed herein may include developing a match-play game in which competing player predictions of a live event outcome determines a match-play winner within the match-play game. The method may include several steps, such as: i) determining at least two sets of outcomes that may occur in the live event; ii) presenting the at least two sets of outcomes to a game designer; iii) presenting a design interface in which a game designer may create a match-play game for at least two competing players; iv) enabling each competing player to select one or more outcomes from the at least two sets of outcomes that may occur in the live event as player-specific outcome predictions in the match-play game, wherein each competing player selects from a different set of outcomes; and v) enabling determination of a match-play performance for each competing player based on comparison of each player-specific outcome prediction with actual outcomes of the live event. In this method a first set of outcomes of the at least two sets of outcomes that may occur in the live event is an offensive set of outcomes and a second set of outcomes of the at least two sets of outcomes that may occur in the live event is a defensive set of outcomes. In this method, determining match-play performance comprises determining separately for each competing player a match-play result of one of win, lose, and tie. In this method, the live event is a live sports event. In this method, the live sports event is one of a hockey game, a football game, a baseball game, and a cricket game.

The methods and systems of game design disclosed herein may include game design of player versus player competitive match-play games based on predicting an outcome of a live event. The method may include several steps, such as: i) configuring a competition module to enable player versus player match-play in a game in which an outcome of a live event determines an outcome within the match-play game; ii) configuring a game match-play module to support player versus player match-play; iii) configuring a rewards module for determining a match-play performance for each player, wherein match-play performance is based on accuracy of player prediction of live event outcomes; and iv) configuring a rewards determination module for allocating rewards based on match-play performance for each player. In this method, the live event is a live sports event. In this method, the live sports event is one of a hockey game, a football game, a baseball game, and a cricket game.

The methods and systems of game design disclosed herein may include game design of crowd versus crowd competitive match-play games based on predicting an outcome of a live sports event. The method may include several steps, such as: i) configuring a competition module to enable crowd versus crowd match-play in a game in which an outcome of a live event determines an outcome within the match-play game; ii) configuring a game match-play module to support crowd versus crowd match-play, wherein a crowd comprises at least one player; iii) configuring a rewards module for determining player and crowd match-play performance, wherein match-play performance is based on accuracy of player prediction of outcomes of the live event; and iv) configuring a rewards determination module for allocating rewards based on player and crowd match-play performance. In this method, the live event is a live sports event. In this method, the live sports event is one of a hockey game, a football game, a baseball game, and a cricket game. In this method, crowd match-play performance is based on normalized player match-play performance across all player predictions for each crowd. In this method a winner of the match-play game is based on the crowd match-play performance. In this method, crowd match-play performance is based on comparing a crowd favorite predicted outcome to an outcome of the live event. In this method, the crowd favorite predicted outcome is the outcome that is predicted most frequently among players in the crowd. In this method, a winner of the match-play game is based on the crowd match-play performance.

The methods and systems of game design disclosed herein may include game design of group versus group competitive match-play games based on predicting an outcome of a live sports event. The method may include several steps, such as: i) configuring a competition module to enable group versus group match-play in a game in which an outcome of a live event determines an outcome within the match-play game; ii) configuring a game match-play module to support group versus group match-play, wherein a group comprises a plurality of players; iii) configuring a rewards module for determining player and group match-play performance, wherein match-play performance is based on accuracy of player prediction of outcomes of the live event; and iv) configuring a rewards determination module for allocating rewards based on group and player match-play performance. In this method, the live event is a live sports event. In this method, the live sports event is one of a hockey game, a football game, a baseball game, and a cricket game. In this method group match-play performance is based on normalized player match-play performance across all player predictions for each group. In this method, a winner of the match-play game is based on the group match-play performance. In this method, group match-play performance is based on comparing a group favorite predicted outcome to an outcome of the live event. In this method, the group favorite predicted outcome is the outcome that is predicted most frequently among players in the group. In this method, a winner of the match-play game is based on the group match-play performance.

The methods and systems of game design disclosed herein may include game design of player versus crowd competitive match-play games based on predicting an outcome of a live sports event. The method may include several steps, such as: i) configuring a competition module to enable player versus crowd match-play in a game in which an outcome of a live event determines an outcome within the match-play game; ii) configuring a game match-play module to support player versus crowd match-play, wherein a crowd comprises a plurality of players participating in the match-play game; iii) configuring a rewards module for determining player and crowd match-play performance, wherein match-play performance is based on accuracy of prediction of outcomes of the live event for the player and for each of the plurality of players participating in the match-play game; and iv) configuring a rewards determination module for allocating rewards based on crowd and player match-play performance. In this method, the live event is a live sports event. In this method, the live sports event is one of a hockey game, a football game, a baseball game, and a cricket game. In this method crowd match-play performance is based on normalized match-play performance of the plurality of participating players. In this method, a winner of the match-play game is based on the crowd match-play performance. In this method crowd match-play performance is based on comparing a crowd favorite predicted outcome to an outcome of the live event. In this method, the crowd favorite predicted outcome is the outcome that is predicted most frequently among the plurality of participating players. In this method, a winner of the match-play game is based on the crowd match-play performance. In this method the player is not included in the plurality of players.

The methods and systems of game design disclosed herein may include developing a match-play game in which an outcome of a live event determines an outcome within the match-play game. The system may include several modules, such as: i) a competition module configuration facility for enabling a game designer to specify at least one type of match-play competition for the match-play game; and ii) a game match-play module configuration facility for enabling a game designer to select a type of live event and for selecting a set of outcomes for the match-play game that corresponds to a portion of a set of outcomes that may occur in the selected type of live event, wherein the game match-play module enables a match-play game player to associate at least one outcome in the match-play game to an outcome in the live event. This system may further include a game play bonus actions and points module configuration facility for enabling a game designer to select a set of bonus actions for use by the player during a match-play game. This system may further include a social media module configuration facility for enabling a game designer to select at least one social media interface from a plurality of social media interfaces for communicating at least one of player, group, and crowd match-play outcomes. In this system enabling a match-play game player to associate at least one outcome in the match-play game to an outcome in the live event includes enabling the player to predict at least one outcome of the live event. In this system enabling the player to predict at least one outcome of the live event includes enabling the player to predict at least one measureable action of at least one real play event of the live event. In this system the at least one type of match-play competition is selected from the group consisting of player versus player, player versus group, player versus crowd, crowd versus crowd, crowd versus group, and group versus group. In this system, the live event is a live sports event. In this system, the live sports event is one of a hockey game, a football game, a baseball game, and a cricket game.

The methods and systems of game design disclosed herein may include design of a match-play game in which an outcome of a live event determines an outcome within the match-play game. The method may include several steps, such as: i) selecting at least one set of competitor types for the match-play game from an opponent set consisting of player versus player, player versus group, player versus crowd, crowd versus crowd, crowd versus group, and group versus group; ii) defining how the at least one set of competitor types are allowed to compete in the match-play game; and iii) defining when the at least one set of competitor types are allowed to compete in the match-play game. In this method, defining how the at least one set of competitor types are allowed to compete includes determining if competitors in a match-play game are allowed to play for the same team and if the competitors are allowed to play for different teams. In this method, defining how the at least one set of competitor types are allowed to compete includes defining that competitors in the match-play game must play for the same team. In this method, defining how the at least one set of competitor types are allowed to compete includes defining that competitors in the match-play game must play for different teams. In this method, defining when the at least one set of competitor types are allowed to compete in the match-play game includes selecting at least one of compete only when a competitor's team is on offense, compete only when a competitor's team is on defense, compete when a competitor's team is on offense and defense The methods and systems of game design disclosed herein may include design of a match-play game in which an outcome of a live event determines an outcome within the match-play game. The method may include several steps, such as: i) selecting a first point in the live event as a match-play starting point; ii) selecting a second point in the live event as a match-play finish point; iii) determining a set of outcomes that may occur in the live event for presenting to players in the match-play game; iv) defining allowable combinations of outcomes in the set of outcomes for associating with an outcome of the live event; v) assigning game play points for each outcome of the set of outcomes and for allowable combinations of outcomes; and vi) configuring a match-play player performance module for determining match-play performance of players based on game play points earned for each outcome of the live event. In this method selecting a second point in the live event is based on a time duration from the first point. In this method selecting at least one of a first point and a second point in the live event is based on an outcome of the set of outcomes of the live event.

The methods and systems of game design disclosed herein may include design of a rewards framework for a match-play game in which an outcome of a live event determines an outcome within the match-play game. The method may include several steps, such as: i) assigning reward points to each potential outcome of a live event; ii) assigning a reward points adjustment for combining more than one potential outcome of the live event into a predicted outcome in the match-play game; iii) determining a reward points penalty for an incorrect prediction of an outcome of the live event; iv) determining bonus points for bonus actions; and v) configuring a player reward points adjustment facility for determining a player rewards point adjustment based on an outcome of the live event, a player prediction of the outcome of the live event, and bonus actions taken by the player associated with the actual outcome of the live event.

The methods and systems of game design disclosed herein may include design of a rewards framework for a match-play game in which an outcome of a live event determines an outcome within the match-play game. The method may include several steps, such as: i) assigning game play points to each potential outcome of a live event; ii) assigning a game play points adjustment for combining more than one potential outcome of the live event into a predicted outcome in the match-play game; iii) determining a game play points penalty for an incorrect prediction of an outcome of the live event; iv) determining bonus points for bonus actions; and v) configuring a player game play points adjustment facility for determining a player game play point adjustment based on an outcome of the live event, a player prediction of the outcome of the live event, and bonus actions taken by the player associated with the actual outcome of the live event.

The methods and systems of game design disclosed herein may include developing a match-play game including single player versus crowd competition in which an outcome of a live event determines an outcome within the match-play game. The system may include several modules, such as: i) a competition module configuration facility for enabling a game designer to specify match-play competition consisting of a player versus a crowd of players for the match-play game; and ii) a game match-play module configuration facility for enabling a game designer to select a type of live event and for selecting a set of outcomes for the match-play game that corresponds to a portion of a set of outcomes that may occur in the selected type of live event, wherein the game match-play module enables a match-play game player to associate at least one outcome in the match-play game to an outcome in the live event. This system may further include a game play bonus actions and points module configuration facility for enabling a game designer to select a set of bonus actions for use by a player during a match-play game. This system may further include a social media module configuration facility for enabling a game designer to select at least one social media interface from a plurality of social media interfaces for exchanging match-play outcomes. In this system enabling a match-play game player to associate at least one outcome in the match-play game to an outcome in the live event includes enabling the player to predict at least one outcome of the live event. In this system enabling the player to predict at least one outcome of the live event includes enabling the player to predict at least one measureable action of at least one real play event of the live event. In this system, the live event is a live sports event. In this system, the live sports event is one of a hockey game, a football game, a baseball game, and a cricket game.

The methods and systems of game design disclosed herein may include game design of match-play games including single player versus crowd or group competition based on predicting an outcome of a live event. The method may include several steps, such as: i) configuring a competition module to enable simultaneous player versus payer and player versus crowd match-play in a game in which an outcome of a live event determines an outcome within the match-play game; ii) configuring a game match-play module to support player versus player and player versus crowd match-play, wherein a crowd comprises a plurality of players participating in the match-play game; iii) configuring a rewards module for determining player and crowd match-play performance, wherein match-play performance is based on accuracy of prediction of outcomes of the live event for each player in the player versus player match-play and for each of the plurality of players participating in the player versus crowd match-play game; and iv) configuring a rewards determination module for allocating rewards in the player versus layer match-play and in the player versus crowd match-play based on crowd and player match-play performance. In this method, the live event is a live sports event. In this method, the live sports event is one of a hockey game, a football game, a baseball game, and a cricket game.

The methods and systems of game design disclosed herein may include game design of match-play games based on predicting an outcome of a live event. The method may include several steps, such as: i) configuring a competition module to enable simultaneous player versus payer and player versus group match-play in a game in which an outcome of a live event determines an outcome within the match-play game; ii) configuring a game match-play module to support player versus player and player versus group match-play, wherein a group comprises a plurality of players participating in the match-play game; iii) configuring a rewards module for determining player and group match-play performance, wherein match-play performance is based on accuracy of prediction of outcomes of the live event for each player in the player versus player match-play and for each of the plurality of players participating in the player versus group match-play game; and iv) configuring a rewards determination module for allocating rewards in the player versus player match-play and in the player versus group match-play based on group and player match-play performance. In this, method the live event is a live sports event. In this method, the live sports event is one of a hockey game, a football game, a baseball game, and a cricket game.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 5 depicts the steps in developing the competition module.

FIG. 7 depicts potential competitive module framework outcomes.

FIG. 9 depicts a baseball game framework overview for competitive module and game play module.

FIG. 10 depicts a hockey game framework overview for competitive module and game play module.

FIG. 11 depicts a football game framework overview for competitive module and game play module.

FIG. 12 depicts a cricket match framework overview for competitive module and game play module.

FIG. 19 depicts examples of a baseball game representation of a competition module.

FIG. 22 depicts a baseball game representation that shows the rotation of "live" game as at-bat players and in-the-field players.

FIG. 23 depicts a baseball game representation that illustrate example of game play point system for at-bat player based on a play's probability of occurrence.

FIG. 24 depicts a baseball game representation showing a rewards program example.

FIG. 25 depicts a baseball game representation showing bonus action examples.

FIG. 28 depicts a hockey game representation displaying match-play game durations.

FIG. 29 depicts a hockey game representation displaying selections based on elements of the game play.

FIG. 30 depicts a hockey game representation that shows selection options for shots on goal during minutes 0-5 of the $1^{st}$ period.

FIG. 32 depicts a football game representation displaying match-play game durations.

FIG. 33 depicts a football game representation displaying offensive player selections before a play starts with a quarterback (the person who takes the snap).

FIG. 34 depicts a football game representation displaying defensive team selections before a play starts with a quarterback (the person who takes the snap).

FIG. 35 depicts a football game representation the selection choices for non-QB plays.

FIG. 37 depicts a cricket match representation depicting the start of game player representation.

FIG. 39 depicts a cricket match representation depicting a batting team player (BTP) outcome and selections.

FIG. 40 depicts a cricket match representation depicting a fielding team player (FTP) outcome and selections.

FIG. 43 depicts a cricket match representation depicting inning-multiplies for each position.

FIG. 44 depicts a cricket match representation depicting points handling.

DETAILED DESCRIPTION

Figure 1:
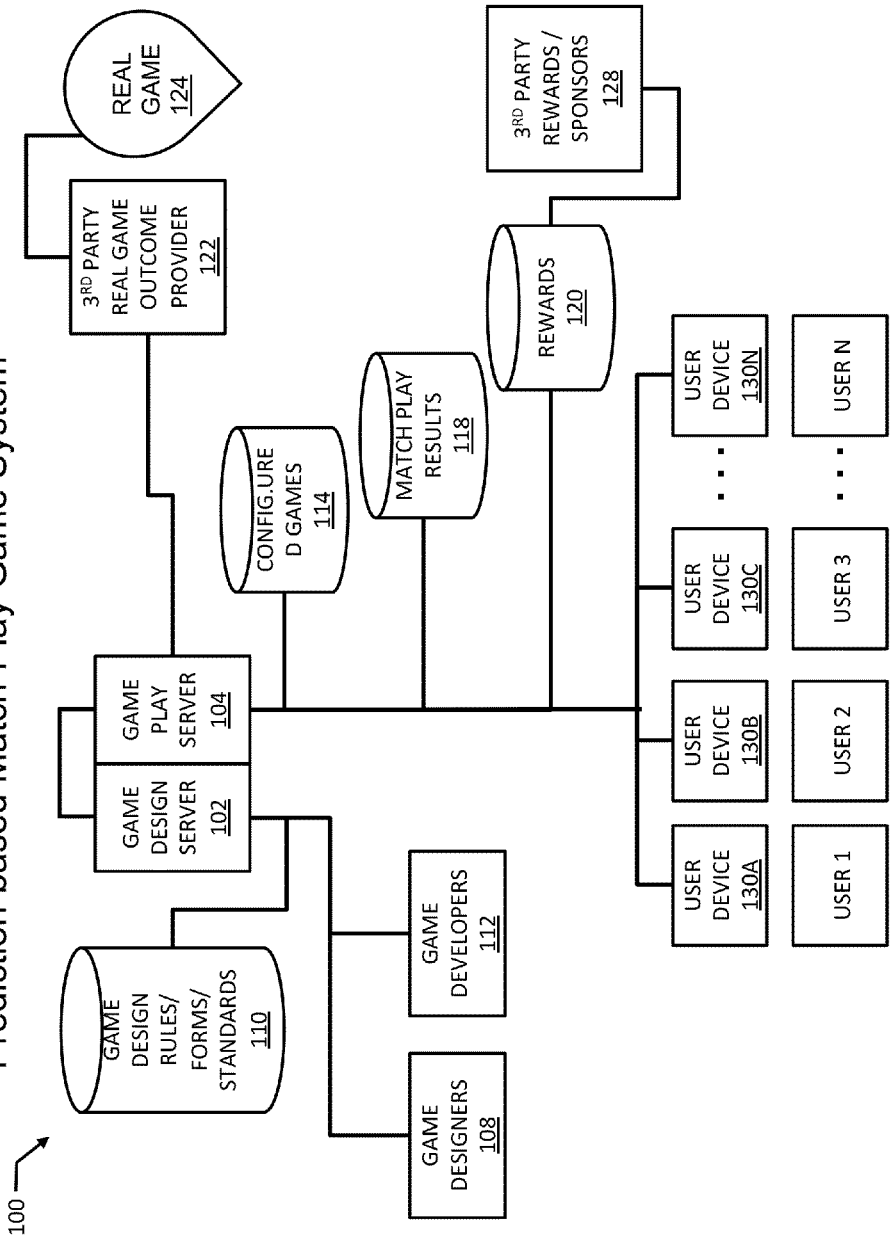
FIG. 1 depicts a high level view of a platform for designing match-play real play event outcome prediction games.

While described herein with reference to various embodiments, it is understood that, in all cases, unless otherwise specified, references to an "embodiment" or "embodiments" refer to one or more exemplary and non-limiting embodiments. Also, it is understood that, in all descriptions herein, unless otherwise specified, even when not explicitly being referenced to an "embodiment" or "embodiments" refer to one or more exemplary and non-limiting embodiments.

For this specification, the following general definitions apply for certain terms used herein. Athletes that compete in the companion live sports event are referred to as "athletes" and they perform in a "real game" that is segmented into sequential "real play events". A "live event" may be a live sports event, such as a real game or real play event. Alternatively a "live event" may be a non-sports event. A "team" generally refers to a predefined collection of one or more athletes participating in a "real game" (e.g. the YANKEES, REDSOX, and the like). There are preferably at least two opposing teams in each real game, although single athlete type real games (e.g. weight lifting) are suitable for use as a companion live event. A "match" or a "match-play game" may comprise any number of real play events, real games, or live events Each match participant is a player or opponent. Each player can select a default team, and/or a temporary team based on the teams of a real game. To simplify description a player may be referred to herein as playing for a team, such as the player's default team or temporary team. A "match" or "match-play game" may comprise a contest between two or more opponents who score points based on predicting the actions of a live sports contest, among other things described herein. A "crowd" comprises players across a plurality of matches who have selected a particular team. Therefore, there may be two distinct crowds for a match that is configured to allow player selection of opposing teams. By default a crowd is associated with a team so a crowd is sometimes referred to herein as playing for a team. A "group" is an associated plurality of players. A player may be automatically assigned to a group based on criteria such as a location where the player is playing the match (e.g. a player playing within a sports bar may automatically be assigned to the sports bar group for the duration of the match). Also, a group may be formed through volunteers who join the group (e.g. a player's fraternity might be a group which the player has voluntarily joined). A group can select a team just like a player so a group may be described as playing for a team herein. Individuals who play games are referred to alternatively as players, users, fans, customers, and the like throughout this disclosure and each such term should be understood, as context permits, to encompass any of the others. A "play" in a match-play game refers to any part of a prediction made by a player and the resulting outcome of a corresponding real play event in a corresponding real game. The "match-play winner" is the player, group or crowd that wins a match or a match-play game.

FIG. 1 depicts a match play prediction game design and play platform 100. In this embodiment, game designers 108 and game developers 112 create a game design rules/forms/standards 110 for a match-play prediction game. It is preferred that game designers 108 and game developers 112 collaborate for consistent performance of the invention. Game designers 108 and game developers 112 may create the match-play prediction game disclosed using any of the many programming methods known to the art, including, but not limited to, C++, C, and other similar methods. The match-play prediction game created by game designers 108 and game developers 112 creating by the game design rules/forms/standards 110 should be hosted by a game design server 102, which is in communication with a game play server 104. The game design server 102 does not have to be housed within the same unit as the game play server 104. The game design server 102 may be the same server as the game play server 104. The game design server hosts the game design rules/forms/standards 110 so that the information from the game play server 104 can be used to create a complete match-play prediction game experience. In this embodiment, the game play server 104 is in communication with a $3^{rd}$ party real game outcome provider 122. The $3^{rd}$ party real game outcome provider 122 takes data from a real game 124 and transmits the data to the game play server 104. Transmission of statistics from the real game 124 from the $3^{rd}$ party real game outcome provider 122 can be done via a network, or any of the other methods commonly known to the art. The $3^{rd}$ party real game outcome provider 122 can provide data such as, but not limited to, batting average, errors, ERA, and the like. The game play server hosts information about configured games 114, match play results, 118, and rewards 120. The game play server 104 is in communication with user devices. The game play server 104 communicates with user devices 130 using any of the many methods of wireless or wired communication known to the art. The game play server provides users, via use of their user device 130, to play the game, accessing configured games, 114, match play results 118, and rewards 120. The game play server can be accessed by multiple users and user devices 130. The rewards stored in the game play server 104 and accessed by users via user devices 130 can be provided by third parties or sponsors 128. These third party rewards/sponsors 128 can be used, but is not limited to, promoting certain products, advertising events, encouraging user behavior, and the like.

Qualifying Sport for Match-Play Game

It is envisioned that prediction-based match-play games developed with the methods and systems described herein will generally be configured to allow match-play that is to a great extent synchronized with real play events in a real game occurring between athletes. In this way, each match-play player will have the opportunity to predict what the athletes will do in a real play event of a real game just prior to the athletes actually performing the real play event. Likewise, the outcome of the real play event will be electronically delivered to the player's game device so that the player can see how his prediction compares to the actual real play event outcome. Actual results may then further be used to determine a winner and a loser of each match play. With this general premise, embodiments of a prediction-based match-play game development system are described.

Figure 2:
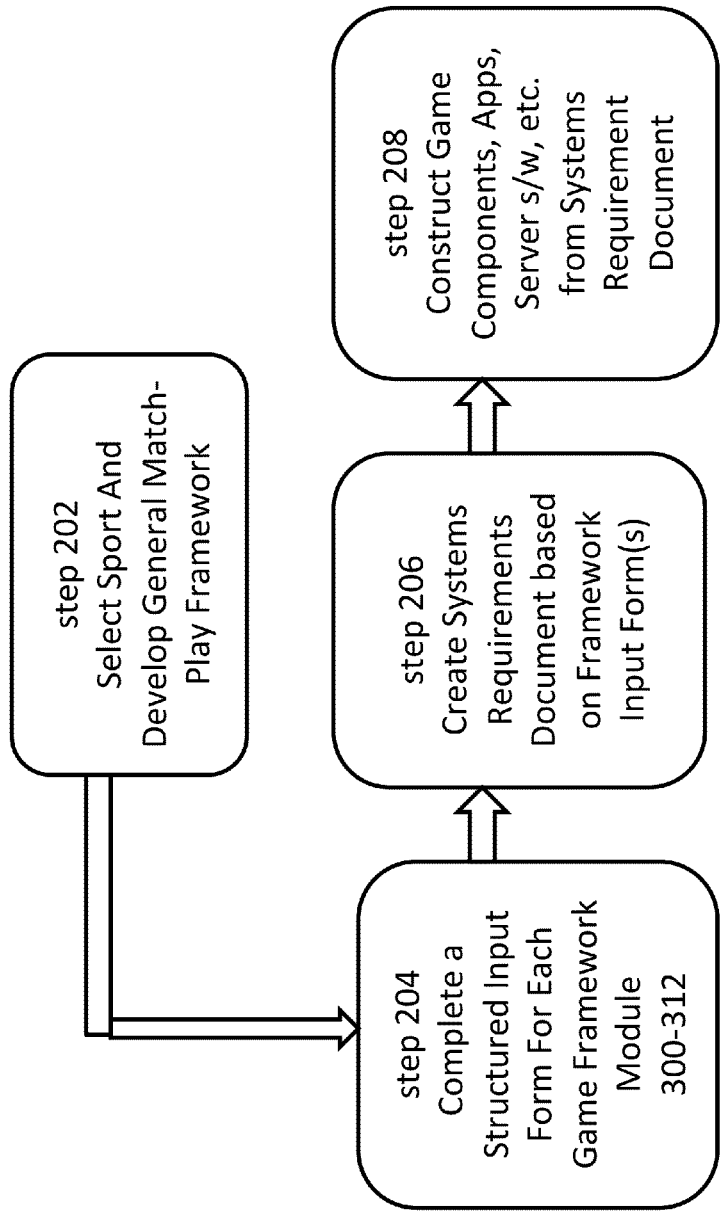
FIG. 2 depicts a high level flow diagram of a method for designing match-play real play event outcome prediction games.

FIG. 2 depicts an exemplary high-level process for a game designer to develop a prediction-based match-play game system for a specific sports league from the creation of conceptual modules through the actual development of a $3^{rd}$-party computer/mobile application software system that can be played using $3^{rd}$-party devices, such as, but not limited to, a TV, tablet, smartphone, radio, or computer, and the like. This high-level process includes four steps including: selecting a sport 202, defining each game framework module 204, creating game system requirements 206, and constructing the game components that will facilitate game play 208. This high-level process and the detailed steps that are described herein are aimed at least in part at helping the game designer answer key questions about the real game for which the game designer desires to develop a prediction-based match play game. Some example questions include: What actions, plays and statistics can be collected during and after the live event and used as a basis for making predictions in a match-play game? Are participants who will make these predictions able to make these predictions, as appropriate, before the real game starts or before each real play event in a real game? Can these actions, plays and statistics be accurately measured and tracked during the real game? Can these actions, plays and statistics be transferred electronically in near real-time to the competing participants? What type of match play can be created between two opponents when looking at what outcomes can be predicted? Is the game free (no charge to play), paid (a fee charged to each participant), or initially free but with charges to access premium features and bonus actions?

Now looking at the high-level process in further detail, in step 202, to create the game framework to build this sports-based match-play game, the game designer may first select the sport and the sports league where athletes and their teams compete and create real play events. For the selected sport, questions may be presented to the game designer through an interactive contextually-adapted design interface that assists the game designer to quickly achieve the goal of developing a prediction-based match play game, such as by providing computer-based structured input forms that are adapted based on the sport selected in step 202 to gather the game designer's input that can be used in constructing and building the sports match-play game.

With a sport selected in step 202, the game designer, in step 204, can construct an overall module-based framework and specific rules and processes for how the prediction-based game can be played and how match play can occur between two or more players. A series of structured, step-by-step interactive game definition input forms may be used to guide the game designer to create the most appropriate game framework and game modules, as described in FIG. 2 that provides details of step 204 of FIG. 2. These game definition input forms may be adapted differently for each sport and within each sub-step of step 204, as there are many subtleties for different sports that the game designer can take into consideration. These game definition input forms may contain the types of questions that will facilitate a game designer creating an engaging and user-friendly prediction-based gaming and match play application. Next, in step 206, the completed game definition input forms may be converted into a game systems requirement document that may refine the game designer's input into language and structures that facilitate structural game development. In one example of step 206, the completed game definition input forms may be evaluated by a programming/design team that may jointly work with the game designer to craft a systems requirement document that could state a wide range of potential ways that users (e.g. players) will engage in the game and match play, including, but not limited to, user interface requirements, how networked systems will capture player data and store all relevant data in databases, capture player match-play selections and corresponding real play event results, some of which is depicted in detail in FIG. 3. In step 208, the game designer may work with programmers and graphic designers to implement the prediction-based game system, interfaces, server software, device apps, and the like. It is envisioned that the prediction-based game play and match-play modules described herein will readily translate to a variety of device-specific software apps that can be used on third-party devices by the players who will compete in the match-play portion of the sport-specific prediction-based game.

In sum, the match-play game framework and game definition process depicted in FIG. 2 may comprise the necessary selections and configurations required to adapt template or default framework modules to be suitable to deliver the type of match-play desired by the game designer. By also leveraging mobile-based game interface and gamification standards, the game designer and programmers may configure user interfaces and other elements of the system based on the completed forms to construct portable game modules that may facilitate easy deployment to new and emerging devices. Default or template framework modules may further include APIs to easily configure the real game event collection and reporting services to facilitate capture of the selected real game events for use in scoring and rewarding players for their success or participation in game play.

The methods, systems, and platforms for match-play real game event prediction game design may be applied to real sports including auto racing such as Formula One, Indycar, NASCAR, and the like; baseball such as Major League Baseball, AAA international league baseball, Japan's Nippon Professional Baseball and the like; basketball such as NBA, Euroleague, and the like; Cricket, such as the Indian Premier League, ICC World Cricket League, England's County Championship, and the like; Cycling, such as UCI World Tour; Tour De France, and the like; Field hockey, such as India's World Series Hockey and Premier Hockey League, Europe's Euro Hockey League and the like; football, such as the United States' National Football League, and the like; Football, also known as soccer, such as Argentina's Primera Division, England's Premier League; United States' Major League Soccer, the World Cup, and the like; Golf such as the PGA Tour, the LPGA Tour, European Tour, Japan Tour, and the like; Team Handball such as the Danish Handball League, German Bundesliga, and the like; Hockey such as the National Hockey League, Russia's Kontinental Hockey League and the like; Motorcycle racing such as the Grand Prix motorcycle racing, and the like; Rugby such as the Australia's National Rugby League, England's Super League, South Africa's Super Rugby, and the like; Softball such as the National Pro Fastpitch, and the like; Tennis such as the ATP World Tour and tournaments such as Wimbledon, World Team Tennis, and the like; and volleyball such as the United States' Association of Volleyball Professionals (AVP), Chinese Volleyball League and the like.

Figure 3:
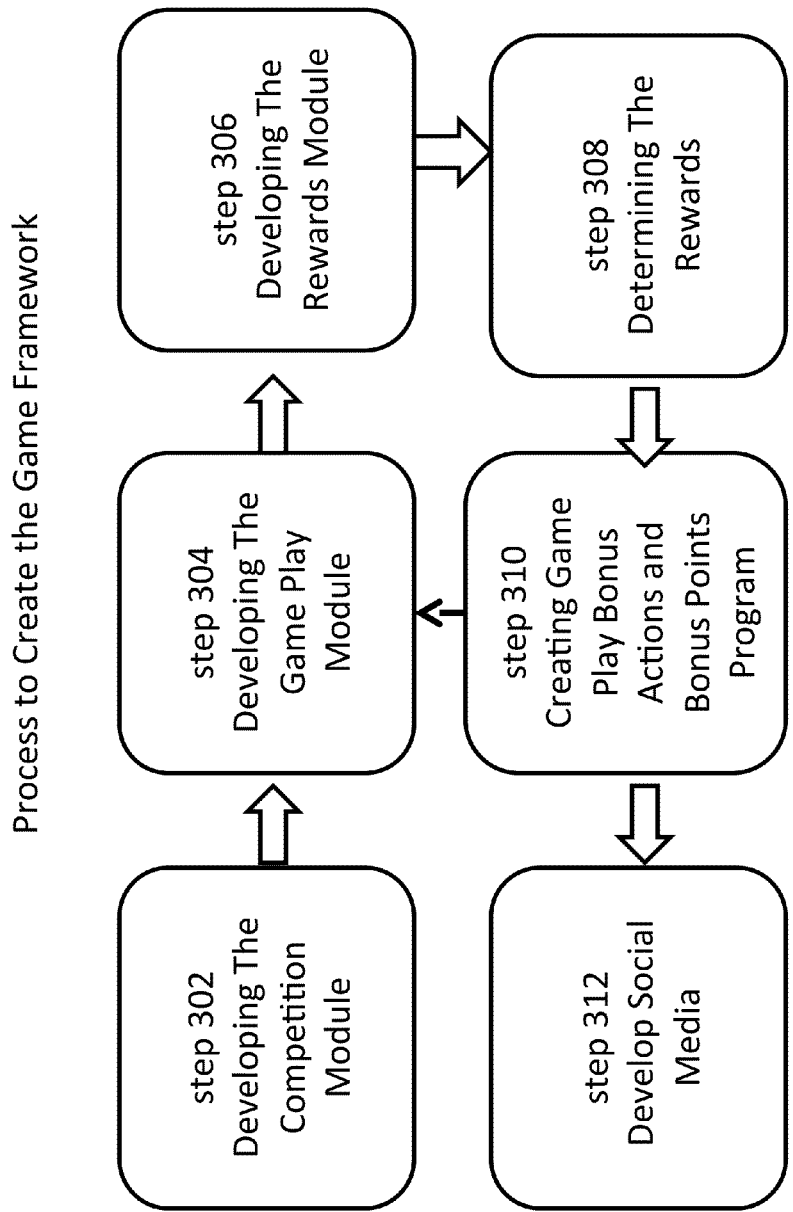
FIG. 3 depicts the process to create the game framework.

FIG. 3 depicts an example of a high-level step-by-step match-play prediction-based game design process referenced as step 204 in FIG. 2. This process may be facilitated by appropriate computer-based input forms that may be used by a game designer during any and all phases of creating this crowd-based real sports interactive match-play outcome prediction game for one or more players.

With a general framework established for a game at a high level, the game designer can build an entire match-play game using the process outlined in FIG. 3. The competition module in step 302 and game play module in step 304, may, in many ways, be developed concurrently as the selected attributes of both modules may be closely related. Recognizing the potential for some dependency between these two modules, the game design platform facilitates game designer-friendly access to the competition and game play modules when either is being configured. In this way, the platform supports making changes to one module to reflect the decisions made with regard to the other module. For purposes of the present exemplary description, the game designer completes the competition module, step 302, first using the choices as depicted in detail in FIG. 5 and FIG. 6.

Figure 8:
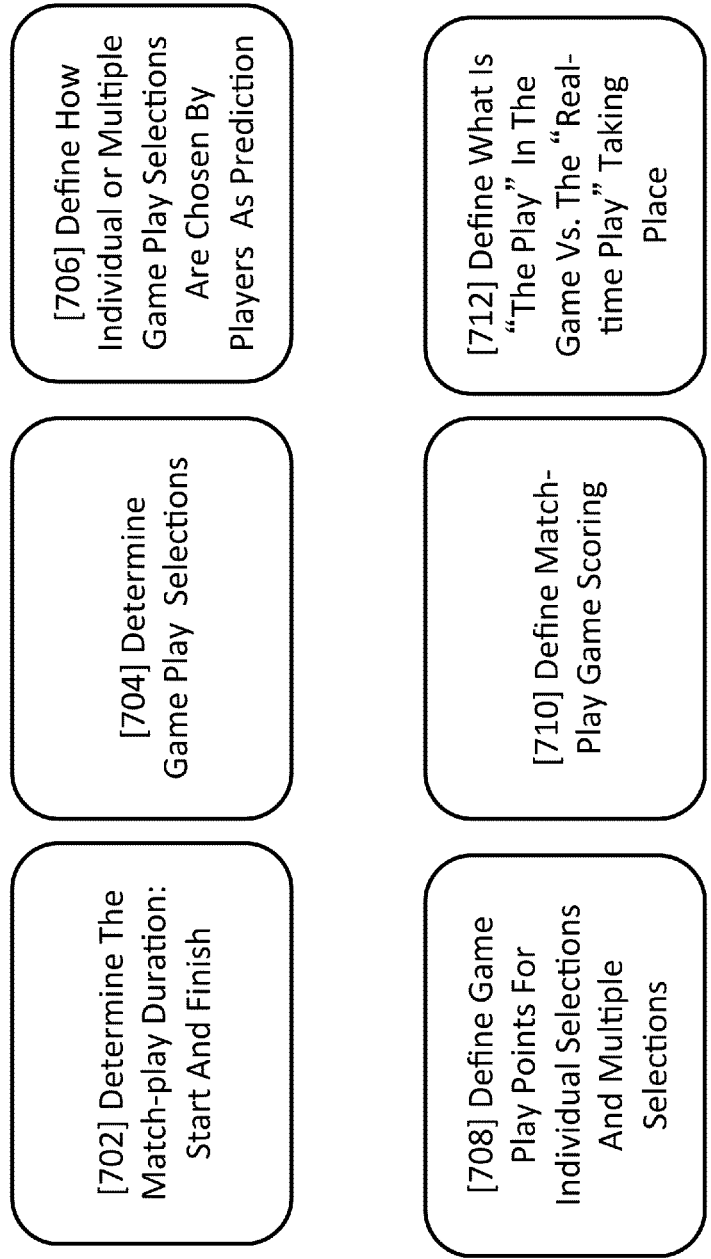
FIG. 8 depicts the activities required in developing the game play module.

Next, in step 304, the game designer picks the game play module attributes to create the game play framework from the choices as depicted in detail in FIG. 8. Generally after these two modules are defined, the game designer may focus attention on completing the remaining steps in FIG. 3. In step 306, the game designer constructs the rewards program that coordinates with the game play module step 304 and competition framework module step 302. The game designer further adds specific rewards in step 308, provides rules for both using bonus actions at the cost of expending bonus points in step 310, and details how players are able to communicate with other players using social media in step 312.

Figure 4:
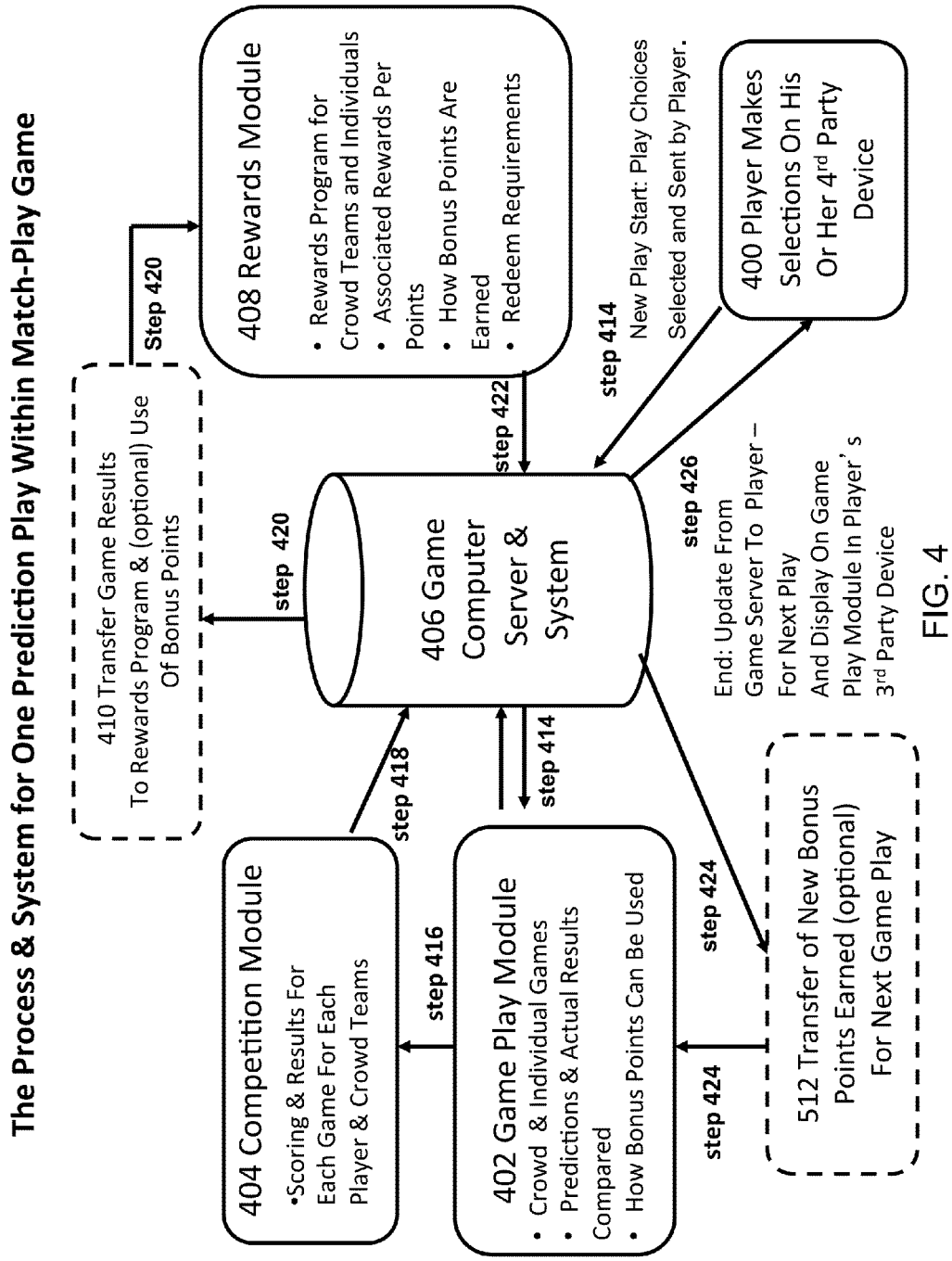
FIG. 4 depicts a process & system for one prediction play from play selection to actual play within a match-play game.

FIG. 4 shows a step-by-step overview of how the game framework defined through the processes of FIGS. 2 and 3 is incorporated into embodiments of the game system and process for completing one prediction play between two opponents in a match-play game. As described herein, a match occurs by performing one or more of these prediction plays within the constructed game framework within a finite match-play start and finish based on the live events. A game prediction play may commence as depicted in FIG. 4 when each player predicts the outcome of the real play event before the real play event commences 400. This includes the use of any bonus points/bonus actions, which are optional per the game design and described in 410, 412. In step 414, player selections are sent to the game's platform that may be operable on a server, such as central server 406. Before the real play event outcome is known, players also have the opportunity to engage with the game play module 402 to earn rewards program points for accomplishing certain actions, such as, but not limited to, answering trivia questions during the game play. This information may also be transferred to the game's platform server 406 so that it is available for reward accounting after the real play event is over.

Next, the platform receives the outcome of the real play event, in real-time, from a third-party information source and then, for each player, in the game play module 402, it compares the player's outcome prediction (and optional bonus points/actions selections) with the actual outcome of the real play event. In step 416, a player's match-play points are then awarded based on the rules of the game and these points are then used within the competition module 404 to update all matches being played, and this information is sent in step 418 to the platform server 406.

Next, the central server 406 is tasked in step 420 to communicate the information (game play points earned or lost, reward program actions completed, match-play win/loss outcome, any bonus points used, and the like) it has received from each player in the match to the game system's rewards module 408. In other words, each player's game play information, for individual and crowd games, is adjusted by the platform, and pertinent data is sent to the rewards module 408 for processing, as appropriate. After the rewards module 408 is updated, the rewards module transfers the updated information, in step 422, for use by other modules in the platform.

In Step 424, pertinent data is made available by the central server to the game play module in order to update the game play module for the results of the play. In addition, the updated game play module is prepared for a new real play event Step 414 and the next play predictions to be made by the players. Pertinent data may include updates to all match-play scores, at appropriate times in the match, adjustments to each player's bonus points 422, if any, and the like.

The central server 406 in step 426 communicates all pertinent data for all games being played, via a data connection, such as, but not limited to, an internet, Wi-Fi, or telecom connection, to all the players in these match-play games. For each player, the central server updates the player's device, based on all pertinent data received from all three game modules for the game play, relative to each match the player may be playing, including all individual vs. individual matches being played and also for any multi-player group or crowd matches the player is involved in.

In sum, Steps 414 to Steps 426 illustrate an exemplary system and process of a constructed crowd-based interactive game for each play within a match-play game. These steps may be repeated, based on the rules of the real sports game, for each play, for multiple plays for each real game, and for the aggregate of all match-play games for all the real games in the actual sports league's season. For sports leagues that play seasons, multiple round tournaments and playoffs, the game designer may design a match-play format that assigns points and rewards based on a running tally of a player's match-play performance over the multiple live events within that season, playoff or tournament.

Developing the Competition Framework Module

Figure 6:
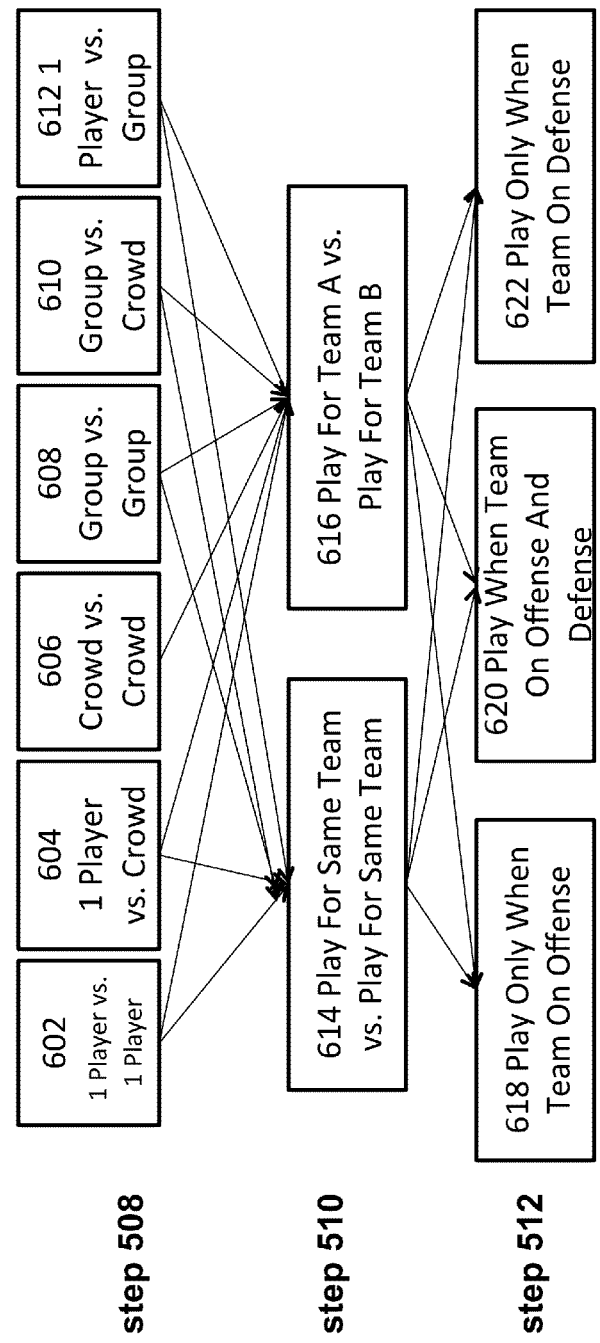
FIG. 6 depicts a sample competition module framework options.

In embodiments, once the sport and sport league is selected 202, the game designer, using the provided example structured input forms, may define the way players can compete in match-play games. FIG. 5 and FIG. 6 both show three distinct elements of a match-play game framework that a game designer may consider when constructing the competition framework module: 1) creating the different match-play game competitions that may be concurrently played during the game between opponents consisting of single players, groups and crowds; 2) defining within the game whether two opponents can play against each other by representing the same real game team and/or playing for different teams; and 3) defining how each player plays the match-play game, i.e.

when to make predictions, when his or her team is playing offense, or defense, or both offense and defense.

As depicted in step 508, the game designer may define the type(s) of match play available in a game between opponents. For example, in step 502 the game designer may define a set of competitor types, including crowd, group, and individual player interactions when developing the competition module, such as, but not limited to, single player versus single player 602, single player versus group 612, single player versus crowd 604, group versus group 608, group versus crowd 610, and crowd versus crowd 606.

The game designer can also define how the opponents of a match will be associated with the teams in the real game. As depicted in step 510, the game designer may choose between a game play where opponents play for the same team in the real game 614, or a game play where one opponent plays for one of the teams and the other opponents play for a different team 616. In baseball, in one representative example, when the Mets team plays the Yankees team in a major league real game, the game designer may configure the competition module so that each player in a match must play only for opposing teams, e.g. a Mets player vs. a Yankees player. If the game designer further selects the competition type to be "crowd versus crowd" in step 508, then the resulting competition module is structured so that all players participating in the match who are playing for the Mets will compete against all players participating in the match who are playing for the Yankees (Crowd vs. Crowd, 606 and 610). Details of how crowd-based games are played and scored are provided in the game play module description below. In the current representation, a game designer could configure the competition module differently for the player vs. player match 602 where both opponents may only play for the same team 614 (and Step 510) and not against the other team. In that non-limiting scenario, the real game has a Mets team competing against a Yankees team, resulting in multiple competitive game frameworks for these 1 vs. 1 matches, i.e. Mets Player vs. Mets Player and Yankees Player vs. Yankees Player, and also the Yankees vs. Mets crowd game. Multi-player games are also possible, in which more than two opponents compete, such as two Yankees players and three Mets players, each participating as individuals and receiving individual scores.

Next, as depicted in representative example Step 512, the game designer needs to define during which phases of the real game the opponents can predict the real event play outcomes. Many professional sports' games have a pause or detectable time delay between real event plays, such as baseball, football and cricket. Moreover, many professional sports pit teams against one another with one team playing offense and the other team playing defense. Thus, the game designer has the ability to configure the competition module to accommodate any variation of predicting offensive plays, defensive plays, or both. As a non-limiting representative example, the game designer could structure the competition module of a match where each player only predicts outcomes when their team is on offense 618, only predicts outcomes when their team is on defense 620, or predicts outcomes when their team is on offense as well as when their team is on defense 622. In baseball, in one representative example and building upon the selections made in steps 508 and 510, the game designer could add the component of a player playing for his or her team when the real-time sports team is on offense and/or also when on defense, Step 512.

In sum, the game designer by completing Step 508 through Step 512, such as by using the structured input forms provided, will have created a number of competition match-play game frameworks that are formed when one selection from each of the steps is combined. In FIG. 7, a non-limiting sample set of potential competition frameworks is listed based on FIG. 6 and consists of one choice from each step. Here are some independent, non-limiting examples of combining all three steps. Framework 702 is an example of a match structure between one player and another player who play for the same team. The match is played only when a player's team is on offense. Framework 704 is another example of a match structure between one player vs. the crowd that is played between the two teams of the live match. One player represents one team and the players (crowd) who represent the other team are playing as the opponent of the one player. The match only takes place when a player's team is only on offense. Framework 506 is another example as the opposing team's crowd plays the other crowd in a match and players play on both offense and defense. Framework 508 is yet another example where one player plays against the crowd of the other team, but they play only when their team plays defense, As seen in FIG. 6, there are myriad match-play combinations that can be created as part of the overall game using the input forms and algorithms developed. In fact, the game designer may create a game where one player can represent one team within the real game, and be participating simultaneously in multiple match-play games as defined in the competition module. While, in theory, a game designer can construct unrelated match-play frameworks into one game, such as combining the 4 match plays of 702, 704, 706 and 708, the integrity of the overall game play may suffer, especially if a player in one match play is playing only on offense and in another match-play is playing only on defense. The game designer may construct related match-play games that revolve around all the matches making predictions the same way, either all on offense, all on defense, or all on both offense and defense. For example, the game designer may create a game where a player not only will play a match-play game for his or her crowd professional sports team against the other team's crowd when only on offense, but also may engage in competitive matches where single player vs. single player of these competing teams also play each other when only on offense.

Developing the Game Play Module

The game play module is the system module that creates the rules of the match-play games. In embodiments, the module may or may not include an exact step-by-step process, but the game designer can use the structured input forms to make informed decisions that will create the game rules that all match-play games will follow. While this module does provide additional game framework based on decisions made by the game designer, it also includes specific elements of each sport that go into creating the game play and how predictions are made, selected and scored. Structured input forms may be used to allow the game designer to make certain decisions about the creation of the game play module, including, but not limited to: 1) to define the start and finish of different competitive match-play games and what determines which opponent wins the match-play game 802; 2) to determine the game play selection options for the predictive play 804; 3) to define how a player can combine selections to make a prediction 806; 4) to assign points to individual or combined selections for being correct or incorrect based on the prediction and the actual real play events outcome 808; 5) to decide from a number of game scoring options how to score a match-play game consisting of multiple plays; and 6) to define the "real-time" cutoff for making the prediction within the context of the real play event.

In Step 802, the game designer may define the match-play start and match-play finish of the match between opponents who play each other in the various combinations of the crowd, groups, and individuals match styles as defined in the competition module. It may be based on logical start/finish points in a real game of the selected sport (e.g. an inning in baseball, a quarter in football, etc.), or may be based on set time frames in a timed game (e.g. last two minutes of a game, in five minute segments of a game, and the like). For a non-limiting example, in baseball, the start/finish of an individual vs. individual match could be a set number of innings played, such as two innings. In addition, the baseball game's crowd vs. crowd match may be 8-innings and players who play two inning games will make contributions to their crowd team for the 8-inning game. In football, the individual vs. individual match could be set by quarter or half-time, and the crowd match could last all 4 quarters where, again, these individuals contribute their scores to their team in the crowd game. For example, if the baseball game match-play game is based on two innings, and two players compete against each other during the $3^{rd}$ and $4^{th}$ innings of a real game, then the player with the most points accrued only during these two innings, based on the rules of the game, will be the winner of the match-play game. In addition, it should be noted that player (or crowd or group) performance in each match might become part of a performance record that may be compared to all other players (or crowd or group), who play in the same league.

In 804 and 806, the game designer has a number of decisions to make in creating the game play module regarding the input elements and output selections for making play predictions in the match-play game before, the real play event in the live match being played between two professional sports teams. One example of a decision is to determine the input selection elements of the game play to be used when predicting the outcome of a real play event. These elements usually involve the different potential results of the real play event and possible components that could be included 804. For example, in NFL football, a real play result may consist of 1) the yardage gained on the play, 2) type of play (ex. Run, pass), 3) to which side of the field did the play end (left side, between center hash marks, right side), and 4) who was the recipient of the play (ex. Running back, Wide Receiver). Any or all of these or similar elements, in any combination, could be used in determining the game play inputs to use.

Another example of a decision for the game play module developer is the number of elements to combine into each input choice, and then how many of these predictive choices can the player make as his or her selection 806. In football, example decisions could be: does it make sense to create input selections based on only one element such as "run" or two elements combined such as "run and 0-10 yard gain" or 3 combined elements such as "run, 0-10 yard gain, play run to left side", or maybe even 4? Then, can the player select one input choice only, or multiple choices as a player's official prediction? In other words, can a player select "run, 0-10 yards" or can a player select two potential selections, such as "run, 10-20 yards" or "Completed Pass, 0-10 yards."?

Another possible decision is to define how points are attributed to a player's official prediction selection(s). Depending on the selection(s), players could receive points for being correct, receive penalty points for being wrong 808, or a combination thereof. Points can be defined in any number of ways, but by no means limited by what is included here. One possible way is by their probability of occurrence as single selections, similar to how odds in a horse race are determined by the probability based on amount wagered. For example, a 50+ yard pass completion has a much lower probability of occurring than a 0-5 yard run and the points attributed to each could reflect this probability differential, with many more points potentially rewarded for the lower probability long pass completion.

Another possible way to assign points is by the predicted outcome's probability of occurrence. For example, a match-play game could reward more points for a player correctly selecting a 4-pitch walk (lower probability) occurring versus selecting a 5 or more pitch walk, or receive more points for selecting a ground out to the $3^{rd}$ baseman (lower probability) versus a ground out to any player (higher probability).

Another possible way is to assign relative points for a play based on the perceived probability of one input selection occurring compared to selecting multiple input elements and having one of them independently occur. This is akin to the win-place-show concept used in horse racing and it is a particularly interesting anchor to use when designing a prediction points system. In one non-limiting representation, a player may select one choice, or two choices, or three choices. If any of the choices are correct, then the player wins and receives game play points. For example, the probability of a home run occurring in baseball is much less than the probability of a single. If the player selects home run, he or she could be commensurately rewarded (like a "win" bet in horse racing). At the same time, if the player selects either home run or single (like a "place" bet in horse racing), then their odds are better for either of them to occur, and they should receive fewer points as a result than if the player just selected "home run" and was right. If the player selects 3 element choices, this equates to "show", and the number of points could reflect the more potential independent ways to be correct and, therefore, reward fewer points for being correct than if selected two (place) or one (win) choices only.

In 810, the game designer has to create a scoring structure for the match-play game. For individuals, in most cases, their score is the aggregate of points awarded after each play for the entire match as described in 808. For multi-player match-play games involving groups or the crowd where multiple players are playing for one team, there are at least three possible ways to provide scores. These methods are non-limiting, and a designer could use any one of the myriad methods of keeping score that are familiar to the art. For example, if 1000 players play for Group A and 200 people play for Group B, then how does the game designer determine who is the winner of this two opponent contest? First, the scores of participating players in a group or crowd could be added together per play and also for a cumulative score over the many plays of a match-play game 518. The team with the most points from these aggregate points from individual players is the winner. This method works well when both teams have equal number of players. Second, crowd or group scores may be normalized using an algorithm to create a score for the crowd that can be compared to an individual's total point score. One potential algorithm involves adding up all the scores for the players on a team (group or crowd) involved in a particular time frame, say a half-inning of a baseball match or a quarter in a football match. Then, dividing this score by the number of participants in the group, yields the normalized score earned for this period of time. For example, if there are 1000 players in Group A and they collectively score 7000 points in the half-inning, then this equates to 7000 divided by 1000 or 7 points for Group A for this half-inning. The winner of the match-play game is the opponent with the most normalized points, using this scoring algorithm for each time period for a defined multiple time period as specified in the match (as defined in step 414). The third potential process, however, takes a completely different approach. The focus for a crowd or group is placed on the actual play selections of all the individual players, rather than the points awarded for play outcomes that result. The play selection(s) that are most picked become the group or crowd's selection(s) and then are compared to the actual play outcome. It is as if the crowd turns into one individual and it is their team's "wisdom of crowd" selection (s) and collective selections that matter. This process to select the group or crowd's "wisdom of crowd" choice(s) can be illustrated by an example where 985 match-play game players are playing for the Mets team, e.g. the Mets' crowd team, against 200 Yankees team players, e.g. the Yankee's crowd team. The game designer has constructed a match-play game where each Yankees player individually plays against the Mets' Crowd team, which is defined as a single player vs. crowd match, where the Mets' crowd selection is their Wisdom of Crowd selection. The half-inning starts and the first Mets batter is at-bat. All Mets players are playing offense and the crowd needs to make its selection(s). For this example, each of the 985 Mets players may select more than one game play option in predicting the outcome of the play. Before the batter hits the ball, in real-time, 564 players independently select on their $3^{rd}$ party device that the batter will hit a "single", and 207 select a "double". The rest of them scatter their picks over the various other choices with no one choice greater than 100. If the rule set were to include all selections made by Mets players for this play that command at least 20% of the selections, then for this play, the Mets' crowd selections would be "single" and "double" and the Mets crowd team would receive commensurate points if either a single or double occurs in the real play event.

In another possible non-limiting example, the match-play scoring between two opponents could be structured based on the marginal point difference between the two opponents where points are awarded for correct predictions, but are then used as currency to convert into game play points. This conversion can occur when either opponent exceeds a set point difference. For example, for a football game, a certain number of these awarded points would be needed to score 3 points or 7 points, i.e. a field goal or touchdown, respectively, based on the rules of the game, especially for when a player can convert these points and what happens to this point differential at natural stoppage points in the real game, such as the end of a half, quarter or period. The designer may consider whether the score returns back to zero or stays "as is" for the start of the next phase of the match-play game being played. In a simplified example, expanded upon in the football section of this document, assume the conversion points are at 10 and 20 for a field goal or touchdown, respectively, and one player is leading 15 points to 4 points (a marginal difference of 11 points). The player can claim a field goal and gain 3 game play points (as this player has a higher marginal difference than 10), or this player can try to expand this point differential to 20 in order to score a touchdown, 7 points. Once points are converted by a player, the game reverts back to a 0 marginal score differential (essentially 0 to 0). In this conversion points game, the player who scores the most game play points at the end of the two section game or the entire game is the winner.

A designer may define when players can make their predictions in a match-play game, especially compared to the real play event taking place in the live professional sports match being watched. This decision impacts the cut-off time for the player making his or her play prediction in his or her device in order to not only make sure the prediction is made before the real play event occurs, but this selection 200 is recorded by the game's central server 206 and marked accordingly as such. This is an important design feature for the game designer. For example, in NFL or College Football, possible details to consider would be: should the play start at the snap of the ball by the center? or just when the offensive players break their huddle? or perhaps when the game play clock has only 15 seconds left on the clock for the play to occur? or from the match system and server 206, a set number of seconds after the player's $3^{rd}$ party device shows a new play input is needed to be made by the player? For a game involving Major League Baseball, should the play selection time frame end when the batter enters the batter's box, or at some other point in time during the batter's at-bat? Once made, this decision has to be enforced technically within $3^{rd}$ party devices and the game system for the entire game.

Developing the Rewards Module

The rewards module may be one of the last modules to be constructed. It is one of the three main modules for the design of a sports prediction game because the concept of providing a points-based rewards system, including the activities associated with gamification, acts as a powerful incentive to encourage use and drive participation among players. The game designer may be prompted to provide or reconfirm the game framework selections for both the game play module and competition framework module for the game being constructed. Given the numerous combinations, it may be possible to create rewards module templates for a number of specific combinations of them, if selected. Alternatively, the game designer may use standard input forms that take the game designer through a general rewards program process to build the module. First, the game designer may develop a rewards system that encourages individual-centric game play, but also drives group-oriented game play incentives for a player to actively be involved in his or her crowd and/or groups. As an example, reward points could be distributed, when an individual player wins a match-play game, when his or her group or crowd wins, too. Second, in designing a rewards module, a game designer also should recognize that most reward programs involve individual gamification activities such as a player receiving reward points for actions that the game wants to encourage. This can occur during a specific event, such as a game play where a player performs a set of actions, and scores reward points. As a possible non-limiting example, players could exchange these reward points for in-game purchases as well as for physical and virtual goods. In an additional possible non-limiting example, reward points could be used, over many time periods, as achievement levels that allow players to attain higher and higher levels in the game. The rewards module could also include multi-player gamification activities where the group or crowd, itself, has ways to score reward points for certain results and achievements, and the rewards are group-based, not individual-based.

Figure 13:
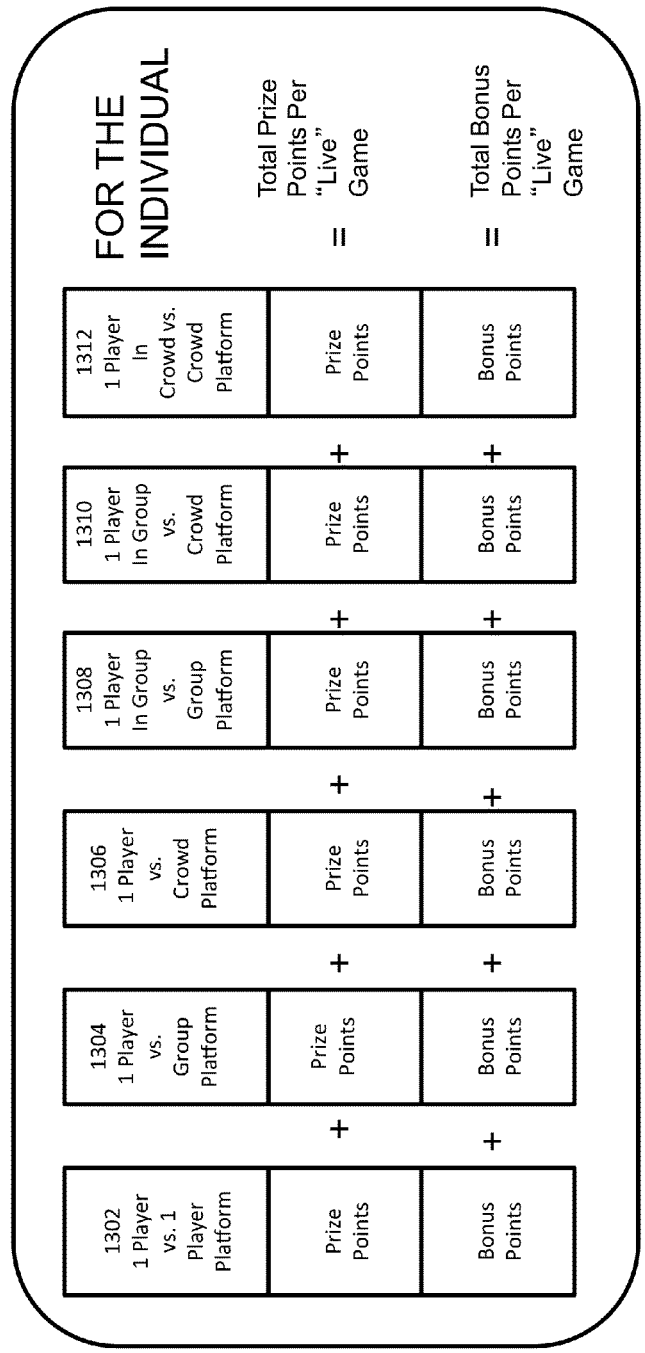
FIG. 13 depicts individual game play rewards platforms for each game.

In creating the rewards program by keeping the above design purposes in mind, the game designer in FIG. 13 may decide on the overall structure of the rewards program for individuals. This could include separate game play rewards platforms for individuals who play directly against other individuals 1302, against groups 1304 or against crowd teams 1306. Individuals can play different matches simultaneously as long as each match is between opponents watching the same live sports match. These are games where opponents know they are directly playing each other, game play scores are tallied after every play, and there is a defined start and finish to their game play. In another representation, this would involve reward platforms for individuals who play within a group or crowd, as part of the team where an individual's score is incorporated into the group's score after every play. Reward platforms can also be created for, but not limited to, individuals who play for their group against other groups 1308, for individuals who play for their group against a crowd, and individuals who play for their crowd teams against the other crowd team 1312. For all of these rewards platforms, the game designer may follow standard gamification procedures to create actions, outcomes and achievements that motivate players to perform and participate and be rewarded based on their own game play and match performance against the opponent.

Figure 14:
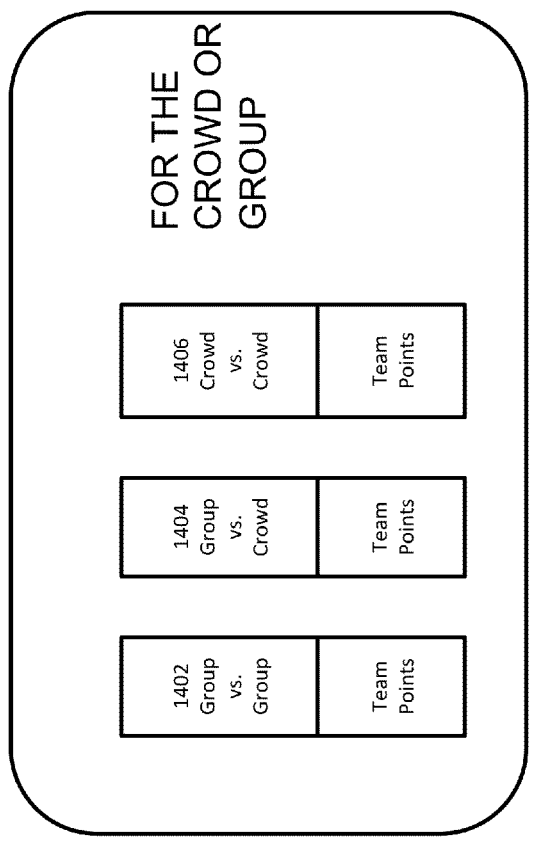
FIG. 14 displays a crowd and group game play rewards platforms.

In creating the rewards program, the game designer may also decide on setting up rewards platforms FIG. 14 solely for groups and/or crowds themselves. These rewards platforms are based on game play between groups that play against other groups 1402, groups that play against the crowd 1404, and for the crowd teams themselves 1406. For example, a crowd team that wins a match against another crowd team would be rewarded. In another example, the crowd team with the best win/loss record in a league could receive a reward. Individuals, however, would not receive any group or crowd rewards. The crowd or group, itself, will receive this reward and it will be a reward that all the players who played for that team can feel good about, perhaps, but not limited to, a local community prize or group acknowledgement.

FIG. 11 illustrates the game designer's need to also create and define the types of rewards and associated reward points to be offered and how these reward points are assigned based on game play outcomes, actions and achievements. There may be a number of different types of rewards that can be created for match-play games. A non-limiting example of one type of reward is based on the individual outcomes, action or achievements 1506 being reached by a player where reward points, called prize points 1302, are distributed after the match is over, as appropriate to the player 1312, and these points can then be traded-in, over time, for a virtual or a physical reward 1310. An example would be to accurately predict 5 baseball predictions in a row for 5 batters and receive 10 prize points. Another example would be an assignment of reward points based on special achievements of a player's chosen team in a live event, such as reward points given to any player whose team makes a triple play. Players will accumulate these prize points, over many games or over the season, and will be able to trade them for virtual and physical rewards.

Figure 15:
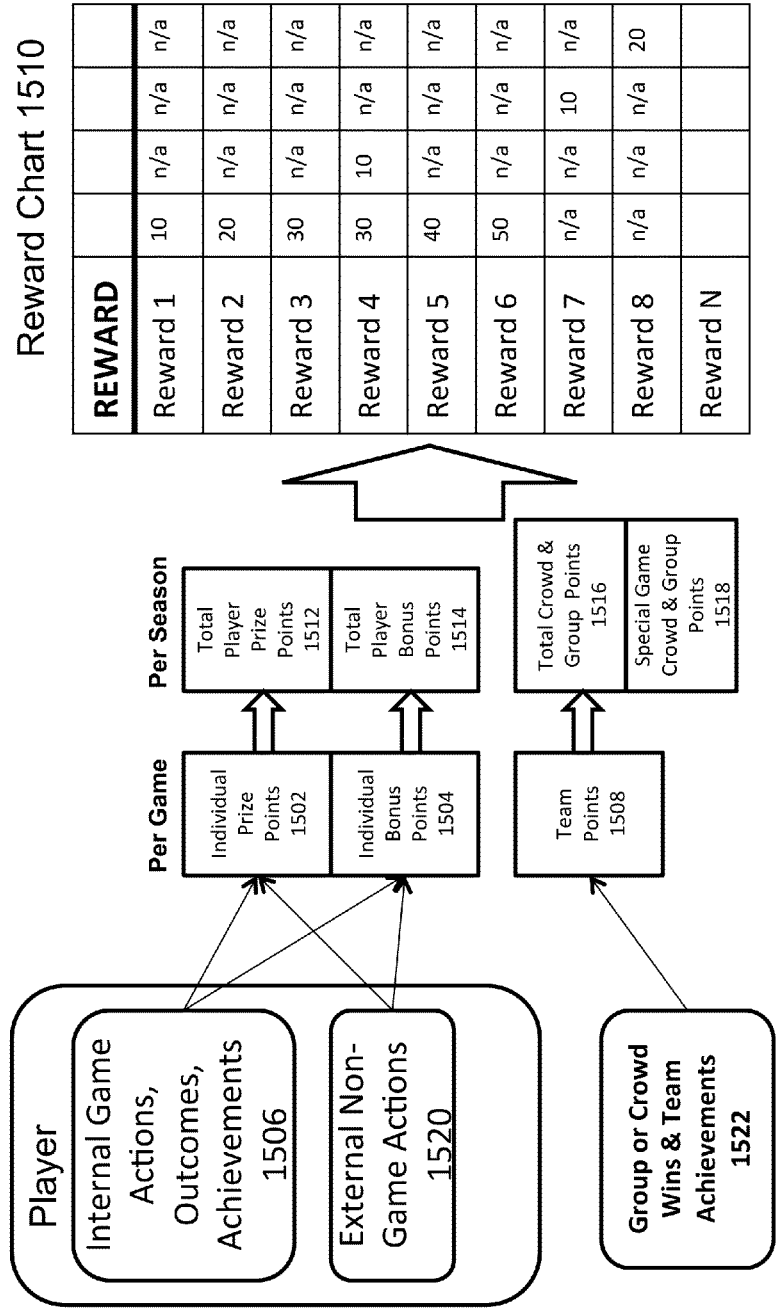
FIG. 15 depicts assigning reward points & rewards.
Figure 17:
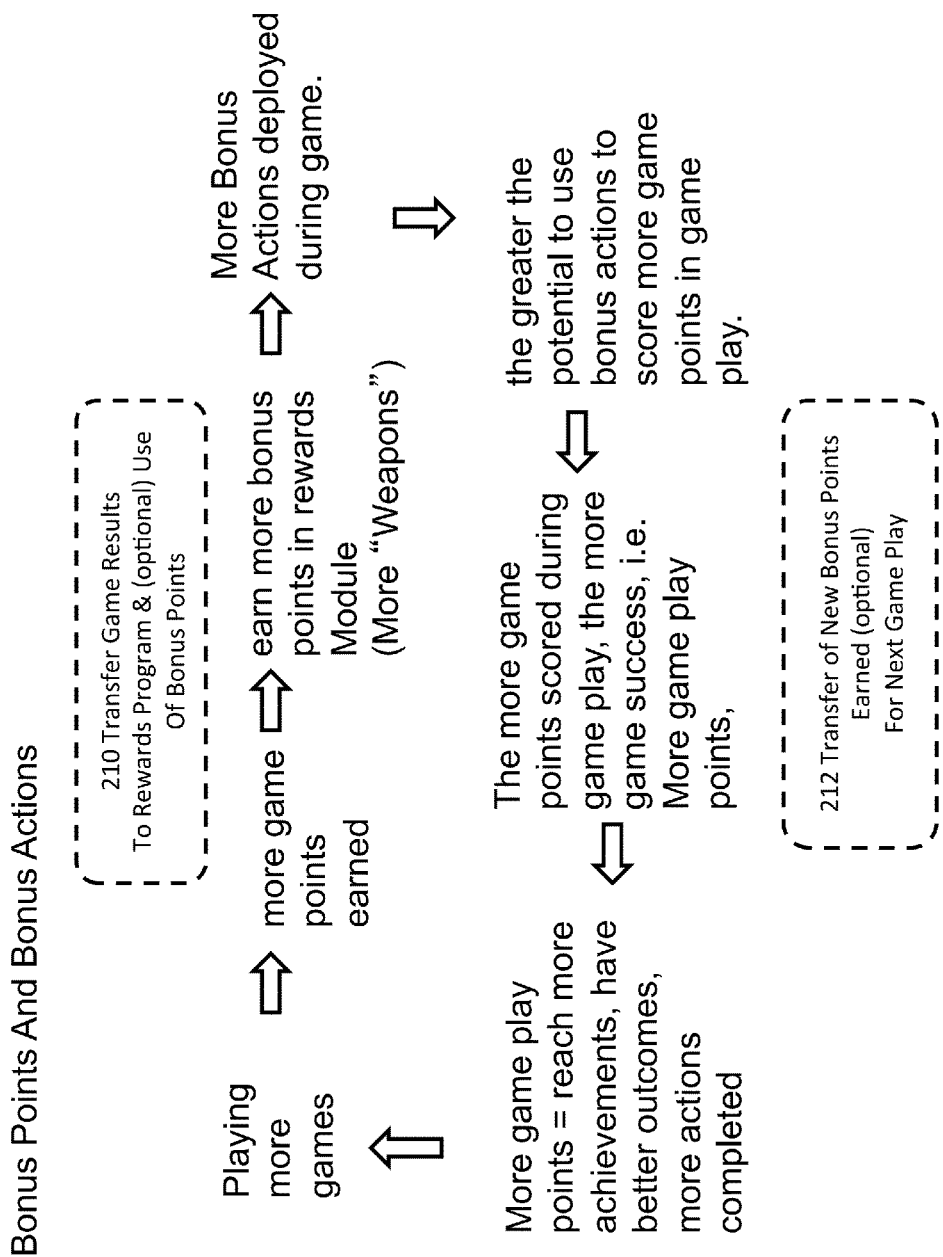
FIG. 17 details the use of bonus points and bonus actions.

Another type of reward in FIG. 15 are rewards associated with earning bonus points 1504, to be used in the actual game play, is described more fully in FIG. 17. In many ways these bonus points are similar to weapons, such as a powerful shield that a warrior earns for achieving certain activities or items during an interactive game such as WORLD OF WARCRAFT. These bonus points can then be used or exchanged in the game for special considerations/powers called bonus actions. Bonus points can be earned, based on the game design, for match-based actions, achievements and outcomes 1506 triggered during game play by a player. Bonus points could be awarded for the same actions, achievements, or outcomes as prize points. Examples of action leading to bonus points are correct answers to trivia questions posed during the game play, or achievement of certain levels or milestones during game play. The list of actions that will earn bonus points is created by the game designer. Similar to prize points, bonus points are distributed during or after the match to the appropriate player 1114. Bonus points can be used in game play FIG. 17 to perform bonus actions. Bonus points can also be used to meet a requirement, as in having a certain number of bonus points to be eligible for a reward that also requires a certain number of prize points 1510. In a possible non-limiting representation of a game, bonus points and prize points could be merged together as reward points to the player. The game itself would then internally track which of those points are considered bonus points and which are deemed prize points, based on the rules of a game's rewards program.

Another type of reward in FIG. 15 is a reward associated with the group and crowd platforms FIG. 14. These rewards are based on crowd-only points or group-only points, called team points 1508. Team points are not distributed to individual players, but are awarded to the group or crowd itself 1516. For example, these points are based on the collective match-play results of a group or the crowd in winning the match, achieving certain performance records or other defined achievements, such as, but not limited to, number of wins in a row 1522. These points can be traded-in for a virtual or physical reward for the group or crowd itself, or their designated representatives as specified in advance 1110. Team points can also be rewarded solely for match-specific outcomes and traded-in for specific rewards for the group of crowd itself 1518. This may occur for special games, such as a championship match, or even specific group vs. group games where the winner receives the reward, such as, but not limited to, a bar group versus bar group match after which the winning group gets some number of free drinks paid for by the losing group.

A player can also earn reward points by doing external non-game play activities 1120 that are related to the match being played. These activities can occur in real life without in-match time limitations, such as, but not limited to, clicking on a product or service offered during the match, or watching a video during the match or after the match. Another example may be going to a bar, joining the group of players at that bar and receiving reward points, or points that can be earned either as prize points or bonus points, or both.

Once the game designer defines the type of rewards points (prize, bonus, team), the game designer may create a rewards chart that will separately 1) define the combination and number of prize points and/or bonus points (added up from each platform) required to earn specific rewards, and 2) define the number of group or crowd points required to earn specific rewards 1110. For example, to win Reward #8, it may take 100 prize points and only be possible if the player also has 60 bonus points, has won 35 single player match-play games, and was a participant in at least 20 crowd match-play wins. The qualifications to earn each reward will be based on a minimum number of points, actions, achievements, and/or other similar statistics. The game designer has the opportunity to be very flexible in creating the rewards chart, as it may be a driver of player adoption and their willingness to participate in match-play games.

Figure 16:
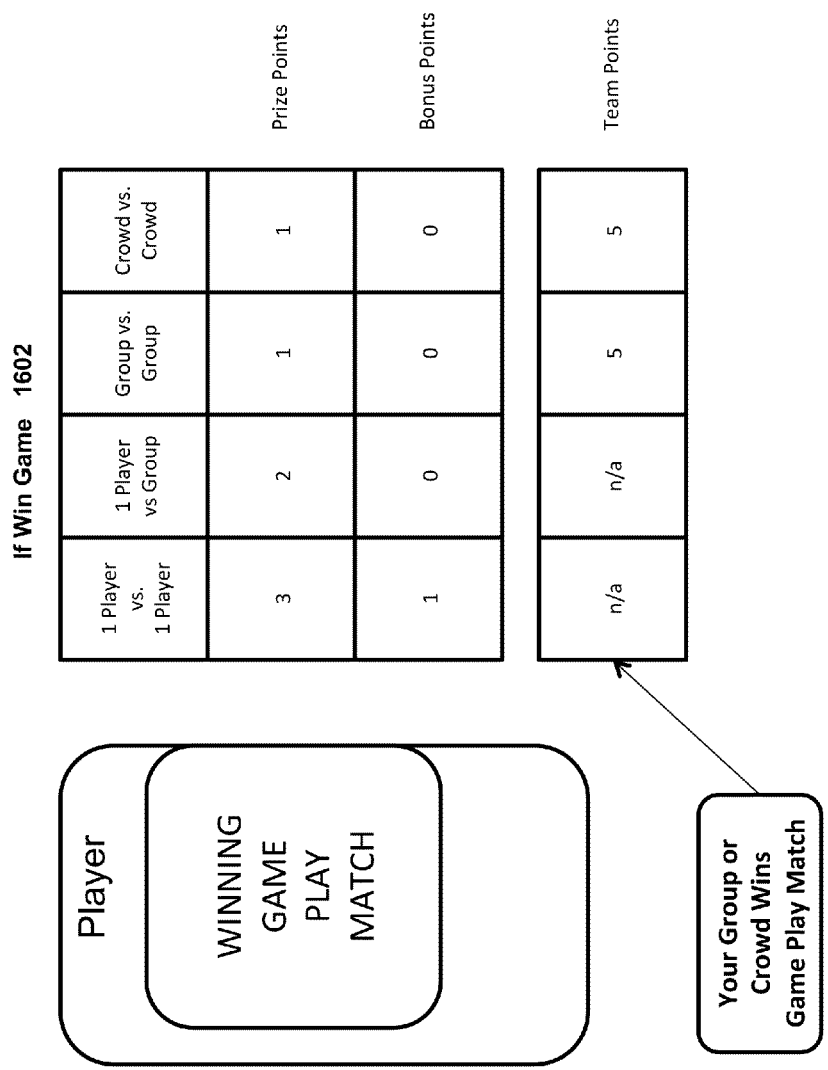
FIG. 16 depicts an example of reward points for one achievement.

In FIG. 16, this chart is an example of how bonus, prize and group or crowd reward points can be earned for one specific achievement, winning a match 1602. In the rewards module, individuals and/or groups and crowds may be rewarded, separately, for their game play actions, outcomes and achievements in the same live event based on the type of match-play game. For example, in one non-limiting representation where reward points are awarded for the player, group and crowd that win their respective two-opponent match-play games, an individual player can, for playing a match, receive 3 prize points if he or she wins each individual vs. individual match as well as one bonus point, 2 prize points if this individual player is also part of a winning group vs. group match and 1 prize point if he or she is part of the winning crowd, too. At the same time, his or her group or crowd would also each receive 5 group or crowd points for winning the match-play game played, respectively, based on the rules of the game being played.

Developing the Use of Bonus Actions and Bonus Points in Game Play

FIG. 17 describes the interaction between bonus points achieved in the rewards module, and their use as bonus actions in the game play. As described in FIG. 4 Steps 420 and 424, the game computer and server 406 acts to transfer all types of reward points for each play and for each player, based on the outcomes, achievements and actions that result in the game play. The computer updates all game modules accordingly, to and from the rewards module. In addition, once the rewards platforms are created, and gamification and achievement incentives finalized, the game designer may look at the games play module 404 and rewards module 406 in FIG. 4 to craft the "bonus points/bonus action" system as shown in 410 and 422, and described in detail in FIG. 17.

FIG. 17 illustrates a key game play feature, called bonus actions, that binds together the importance of the game play between opponents in a match-play game, and the rewards module as described in 410 and 412. Bonus actions are tailored to specific key actions in the live match that the player makes after his or her selections for the upcoming play that provide the player with an opportunity to score more points during the play or during the time period of the match. As described in 410, the game designer has the opportunity to tailor bonus actions to the construction of the match-play game process based on, but not limited to, how the game modules have been put together, game play points assigned, and total reward program points added. When creating the right bonus actions and commensurate rewards, the game designer may also want to balance this upside by developing a fee, or cost, for a player to use each type of bonus action during game play. This cost could be, but is not limited to the subtraction of a set number of bonus points for using each specific bonus action, as well as subtracting game play points, if the bonus action that is selected does not occur.

The use of bonus actions and bonus points in game play provides an interactivity and incentive among players in the match play that fuels playing more games. Playing more match-play games leads to both more game play points earned and additional opportunities to earn rewards bonus points, especially as game play points are transferred to the rewards module from the competition module Steps 418 and 420. The more bonus points, the greater the potential to use bonus actions to score more match-play game points in future game play. The more match-play points earned during game play, the more match success and this leads to greater rewards by individuals, groups and the crowd over the sports season. A sports season can be defined for this present disclosure as the start and finish dates for the professional sports league season or for specific start and finish dates within the season itself. The bottom line is that the user is able to use Step 424 bonus points during game play to bring more Bonus Actions in each match-play game.

Bonus actions can occur if the player during the game play of the match decides to go for additional game play points for a particular prediction play, as defined by the rules of the match-play game being played. For each sport, such as baseball, football or cricket, there exist certain times when the situation of the real game provides a player with a predictive insight into the potential action of the next play to occur. To capture these situations, a game designer may create specific bonus actions that the player can use to score more game play points for being right on a particular prediction play. First, the game designer needs to understand the type of situations that warrant these potential actions. Next, the game designer has to review the scoring system within the competition module for each type of play and determine how a player should be rewarded (number of game play points earned) when the following occurs—a bonus action is selected, the play happens, and what was predicted per the bonus action actually is correct. The game designer may also, however, have the potential to penalize the player depending on the bonus action used, if incorrect. This is where the player possibly loses game play points as the penalty. For example, in football, a player could double down as the bonus action and receive double the potential points for being correct on predicting a play outcome being "a pass completion from 0-10 yards." The player, however, may also have the potential to incur double the potential penalty points if incorrect.

In embodiments, a player may not have unlimited ability to use bonus actions. As described in FIG. 4, the computer system 406 keeps track of the bonus points earned by each player during game play and transfers these bonus points into the rewards module 410 after each play and over the sports season the number of bonus points increase as the player accumulates actions, achievements and outcomes from playing multiple games and many match-play games. For each and every match, a player may use their bonus points. If, for example, a player has earned 15 bonus points, then every match he or she plays, the starting point may be 15 bonus points to use during the match. For the specific match being played, the game designer may incorporate the loss of a set number of bonus points, as defined by the rules of the game played, when a bonus action is used in the match. These bonus points of each player may be known by both opponents, and are available at the start of each game played by a player. Like weapons in a multiplayer combat game, they are used as the player wants to perform a bonus action and can be viewed as spent fuel until the players no longer has the points to trigger a bonus action. For example, the bonus action called double down could cost 3 bonus points to use, but could increase the game play points by 10 points if right, from 10 to 20 points. The player can win an extra 10 game play points but does lose the 3 bonus points, regardless. If a player started with 15 bonus points, this player would be left with 12 points of his play is unsuccessful.

Creating the Game

In FIG. 3, the game design is completed when steps 302 to 308 have been performed and the match framework and rules have been constructed for each of the 3 main modules, as well as the interaction of bonus actions and bonus points. Last, the game designer may decide, at this time, to build in certain social media features, such as direct connections to Facebook, Twitter, Google Plus and other social media sites based on achievements earned, winning a match, or numerous other match activities.

To illustrate the game design process and system as described, representative samples of crowd-based interactive games for baseball, football, hockey and cricket are described below. For baseball, examples describe a game created by a game designer in detail compared to the game design process described herein. For the other sports examples, the game framework and game modules will be described with accompanying figures, but without the same written linkages to the general framework as the ties described for baseball. For the most part, the other sports will share the same ties to the general framework that the baseball example has. FIG. 9 for baseball, FIG. 10 for hockey, FIG. 11 for football and FIG. 12 for cricket provides summaries of the games developed using the design methodologies and framework provided.

For Baseball

General Game Design Framework

As part of the input forms, a series of questions are provided to the game designer to provoke ways to construct an interesting and engaging game for users. At its very core, these questions may give a game designer pause to move forward or encouragement to push forward with constructing a user-friendly game and various match-play games. Baseball plays and games have excellent qualities for turning a sports game into a prediction-based interactive game. First, its actions, plays and statistics are captured in great detail during and after real game play action occurs by a number of 3$^{rd}$ party companies. Second, there is a great deal of time between each batter and actionable play for players to play these match-play games. Third, these plays can be measured and tracked easily and transferred electronically to all participants. Last, there are numerous ways for match-play games to be developed. Overall, the game designer has almost no downside to push forward to the next serious of input forms related to the 3 game modules as described in FIG. 3.

Described herein is a computer-based match that is played on a computer, tablet, TV or smart phone and the like that is linked to live play of a baseball game. There are numerous ways to construct a prediction-based game and its match-play games based on completing the competition module as detailed in FIG. 18. The below representation featured herein is one possibility. In this example, the game takes place between two opponents when watching or listening to a live baseball game. The match-play matches occur synchronously with the live baseball game and are played in half-inning increments, just like the live baseball game. New batters presented in the match game are the same batters that are performing in the live baseball game. The match-play game is centered on each batter's at-bat in the live game and how both match players make selections as to the outcome of the batter's at-bat in real-time. After the official outcome of the live at-bat happens, the game uses software algorithms to compare both players' selections with the official outcome of the at-bat as generally depicted in FIG. 3. Then, either the next live game's batter comes to the plate or the previous outcome is the third out and that causes the live team's at-bat to end and the half-inning to be over. The match game continues with the players making predictions for outcomes when the next half-inning starts.

In general, players score match-play points when their prediction selections are correct (match or substantially match the actual outcome in the real game) and if their predictions are wrong, may lose points due to penalty fees, if any, based on the rules being played. The player with the most points at the end of each two-opponent match wins the match-play game. It does not matter how many hitters step up in each half-inning because both players can score points for each batter.

As shown in FIG. 4, the game system then cross-references the correct selections in the game play module and competition modules to find the number of points scored, and gives these points to each player, as earned. In general, the game system keeps track of these points for each player cumulated over the entire match. Players can also earn reward points based on their game play actions, achievements and results, and these points can be accumulated over many games.

The match-play games can be played with an appropriate device at the baseball stadium where the live baseball game is being played or while watching the game in the device, such as a TV, smart phone, tablet, and/or computer, as well as listening to the real game on radio. The match game can also be played just by using the game software on an appropriate device.

Below is a potential baseball game design using the general game design framework described above, and the development of a specific match representation, using the process defined in FIG. 3, where one first creates the competition module feature set, then develops the game play module features, and then the rewards platform, and bonus actions/points interactions in steps 302 to 312.

Baseball Game Representation #1
The Competition Module

Figure 18:
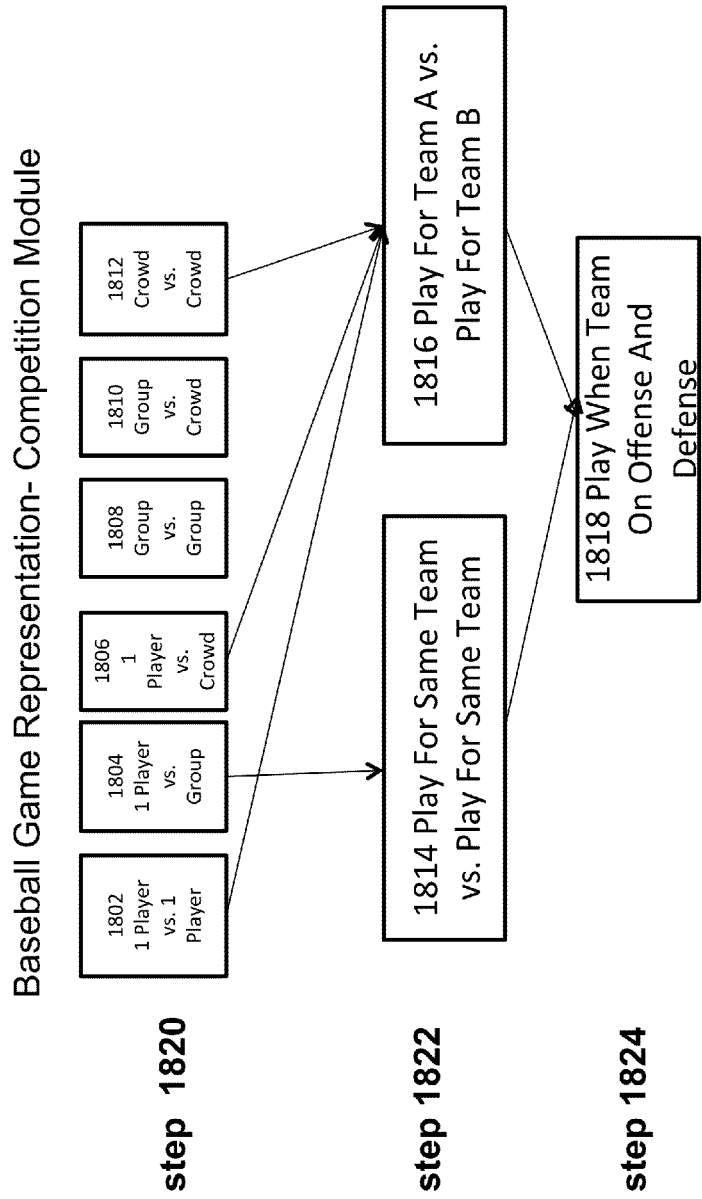
FIG. 18 depicts a baseball game representation of a competition module.

FIG. 18 illustrates the choices made by a game designer in creating the baseball game's competition module. Based on steps 508, 510 and 512, the game designer has looked at each combination of single player, group and crowd to see what makes the most sense in creating match-play games and in step 1802, 4 of the 6 different match-play competitions are all selected for this game: crowd vs. crowd 1812; crowd vs. individual 1806, individual vs. group 1804 and individual vs. individual 1802. Next, in step 1804, the game designer can select the opportunity for players to play against others from the same team 514 as well others from different teams 516. The game designer selected the group vs. individual match play game to be against the same team, and all the other matches to occur between two opponents on different teams for 3 of the match play 1816. Last, in step 1806, all players will play on offense (at-bat) and on defense (in the field) 1818. As depicted in FIG. 15, the Mets player M123, who makes his or her selections based on the live Mets/Yankees match, has games against 4 different opponents who play the same innings as he/she. This includes a game between all Mets fans at the bar, who form a group, and each individual bar attendee who is a Mets fan. If there were 10 Mets fans in the bar, there would be 10 different match-play games between 1 Mets fan and the rest of the Mets fans in the bar. One can imagine the engagement level for these players as they see their relative scores against others in the bar.

The Games Play Module

Figure 20:
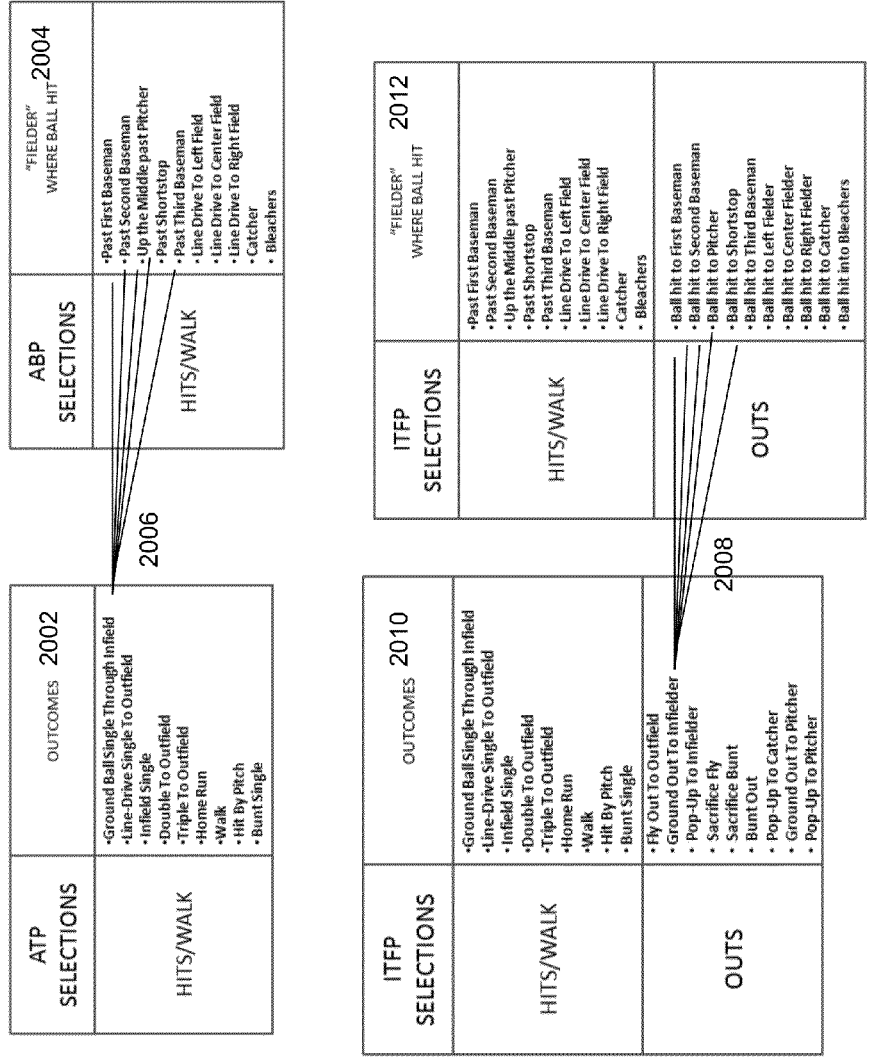
FIG. 20 depicts a baseball game representation describing the elements of the game play.

Game play can include various match-play construction decisions, such as defining the game play elements 802, and combining them into selection choices 804. In this match representation, the player at-bat is asked to only select the type of "hit" (as choices) when making a selection, whereas the player in the field is able to select either hits or outs as choices. These input elements are described in FIG. 20 as the potential prediction play outcomes of the live play (of the at-bat) 2002 or 2010 and to which fielder the ball may be hit 2004 or 2012. In the match, both players, depending on their team being at-bat or in the field, are asked to make their selections by combining one choice from each of these two independent elements. The At-bat outcome selection matrix 1806 shows prediction outcome choices available to a player who is predicting the outcome of the current batter when the player's team is at bat. The match-play game is designed to require that the At-bat player select both a type of hit 1802 and a location for the hit 1804. In this example, the player has predicted that the current batter will hit a ground ball single through the infield as the type of hit 1802. Hit direction matrix 1804 shows the choices that the player can make for where the ground ball could be hit. In the field outcome selection matrix 1808 shows outcome choices available to the opposing player who is predicting the outcome of the current batter when the player's team is in the field. The match is designed to require that this opposing player select either a type of hit or a type of out 1810 and a location of the hit or out 1812. In this example, the player has predicted that the current batter will make an out and the type of out will be a ground out to an infielder 1810. Based on this step in the prediction of the outcome, the player may now choose a location of this ground out 1812 by identifying one of the infielders.

For this match, the duration from a defined start to a defined end 708 for a match play game for individuals vs. individuals is two innings. The crowd game is 8 innings, although it could be structured as 9 innings, depending on how the game designer wants to handle the last inning when the home team is winning and does not come to bat. The scoring system for two individual opponents 810 is structured where points, earned for correct predictions, are cumulative, and scoring is adjusted after each half-inning of the live match, just like in baseball, and totaled for all players at the designated duration of the match, depending on who is playing each other, or after the real baseball game's $8^{th}$ inning is completed. In player vs. player matches, the player in each match with the most points, during these 2 inning games, wins the match.

Figure 21:
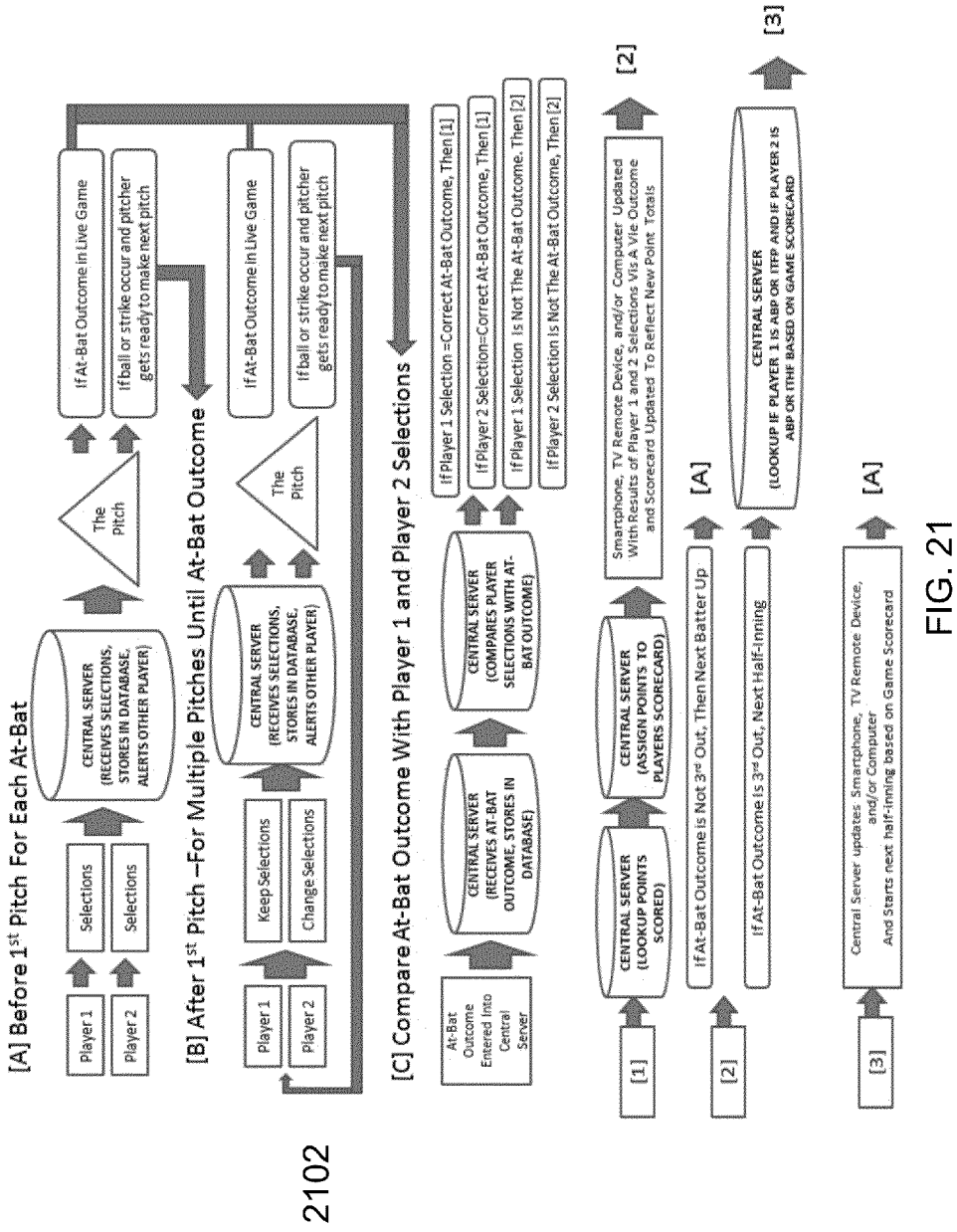
FIG. 21 depicts a baseball game representation showcasing the competition module.
Figure 26:
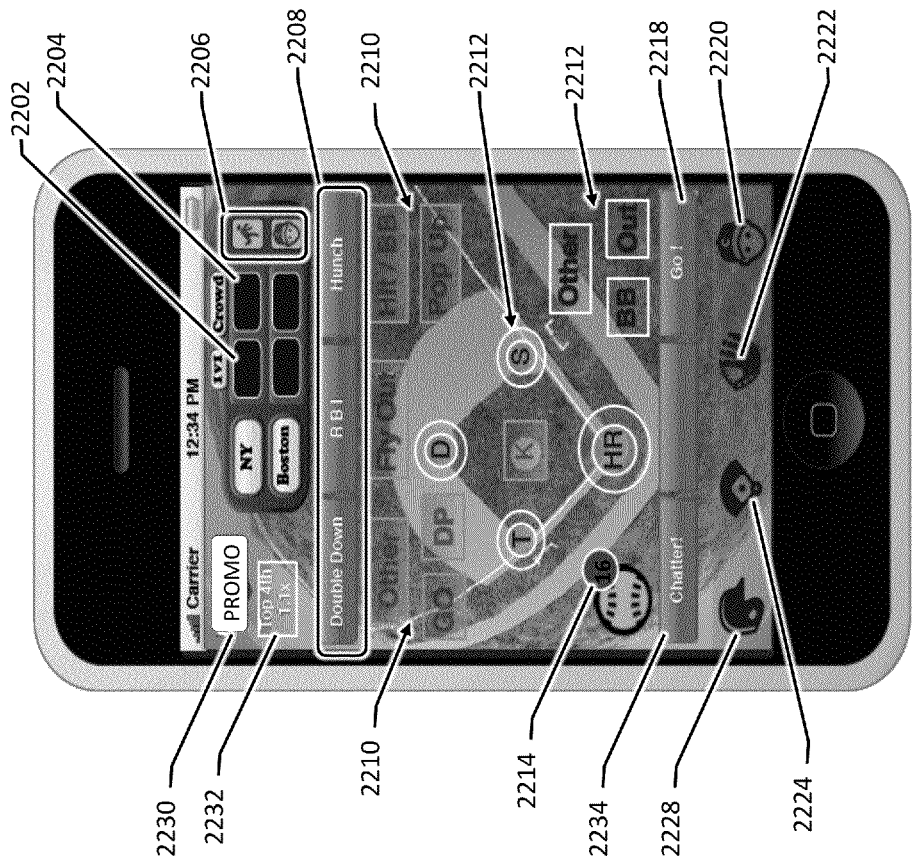
FIG. 26 depicts a baseball game representation displaying a mobile app screen example.

The rules for playing the match are described in the game play module, and can include decisions about the actual game design flow from first pitch to a batter by a pitcher to an outcome by the batter and when a play selection can be submitted by $3^{rd}$ party device to the game computer 206. As noted above, player scores are updated after each half inning, which starts with the first pitch of the half inning and ends with the third out of the half inning. In this representation, the game play module is configured to allow players to make or change selections between each pitch to a batter. In FIG. 21, if the batter does not hit a pitch thrown by the opposing team's pitcher, then before the next pitch, both players may make changes by keying in new selections that take precedence over previous ones 2002 and 2010. The next pitch is thrown and either an official outcome of the at-bat occurs (i.e. walk/hit, or out 1802 and 1810), or the umpire calls a ball or strike and the batter/pitcher duel continues until an official outcome occurs. After each pitch that does not result in an official outcome, the players have the option of changing their outcome prediction. 2102 Each player receives the selections the other player makes, to assist in deciding to switch selections or not. After the official outcome of the at-bat happens, either the half inning continues when the next batter comes to the plate or the official outcome is the third out and that causes the half inning to end.

In match-play games where a group or a crowd is involved as one of the opponents, the scoring system for group and crowd selections, as part of Step 416, are to be normalized, in this match representation, by adding up all points of the players in the group or crowd, and then dividing by the number of players for the same group or crowd. In general circumstances, this normalization scoring process when used for crowd vs. crowd may also, in the same match, be used for group vs. group 1808, crowd vs. group 1810, "1 vs. group" 1804 and "1 vs. crowd" 406 1806. In the example, normalization may be used in the group vs. individual player match 1804 and crowd vs. crowd match 1812.

In another representation of a match-play game for the crowd vs. crowd game 1812, the game design could include "wisdom of crowd" selections as a crowd's automatic predictive outcome. Rather than be based on normalizing the cumulative points from all players for their individual game play, these predictive selections by the crowd could be made based on the most popular selections of a crowd team, i.e. all the members of a team's players. If, for example, 2019 people playing in the field for the Mets selected "strikeout by pitcher" as the top combination made, and 2018 people selected "ground out to shortstop", then "strikeout by pitcher" would be the selection by the Mets' crowd team in its crowd vs. crowd match as it received the most selections, i.e. "votes." This selection process when used for crowd vs. crowd may also be used for group vs. individual 1804.

In another variation of the game play in another match-play game creation process, a player's selection could not be changed once made, as compared to the example in FIG. 21 in which a player can change outcome prediction selection before each pitch. In another variation, the basis of both at-bat and in-the-field selections are only, respectively, the outcome elements 1802 or 1810, and not the location to which the ball is hit 1804 or 1912. Thus, for example, a ground out (and without stating to which fielder) would be the prediction selection to be used and compared to the actual play outcome. Each such variation characterizes a different type of game play that could be constructed as the game play module, and in all cases, the game play relies on the game's processes and system as described in FIG. 4.

Also in determining the play, players will be offered prediction selections in FIG. 22 based on the role (at bat or in the field) that their respective teams hold during each half inning. In an example, player 1 has selected to predict outcomes for the visiting team so player 1 starts by predicting at-bat outcomes because the visiting team is at-bat; Player 2 predicts for the home team and starts by predicting in-the-field player outcomes. Conversely, when the home team comes to bat, Player 2 chooses from the at-bat outcome choices and when the visiting team is in-the-field, Player 1 chooses from in-the-field outcome choices Game play points are awarded to the players for each prediction play based on their selections being correct. For each play, the game design needs to include the potential points (or penalty fees) earned from each "combined" selection created using the game play elements 2002 and 2004 for the at-bat player, and 2010 and 2012 for the in-the-field player. In addition, for this match representation, players can make multiple outcome prediction selections that will increase the chance of one of the selections matching the official outcome, similar to the "win, place, show" model described above.

A simplified point schedule depicted in FIG. 23 is based on the predicted probability of occurrence of one of the multiple selections. In this representation in FIG. 23, the 4 selections of "single, double, triple or home run" each receives 5 points (for probability of one of them occurring) if correct and a negative 2 points if selected and incorrect. In the same point system to be used, the multiple selection of "single and double" could receive 10 points for correct and negative 1 point if incorrect. The extra 5 points for correctly predicting the official outcome are due to limiting predictions to two choices rather than four choices (as above), as well as the probability of occurrence of each of the two choices.

The Rewards Module

In this representation of the match-play game, the rewards module consists of three types of reward points: prize points, bonus points and team points. There are myriads of examples where a player's internal game play translates to an action, outcome or achievement that merits receipt of reward points. For example, in FIG. 24 a player that wins a direct player vs. player match between two individual players will receive 10 prize points and 1 bonus point. In another example, a player who correctly answers 2 of the 5 trivia questions asked during the same inning will received 1 bonus point each for the two correct answers and no prize points. In yet another example, a player who finishes in the Top 10% of all players in game play points in the same two-inning match will receive 5 prize points and 1 bonus point. Furthermore, these prize points, during the match and baseball season, can be accumulated and can be used to purchase goods and services. For example, 100 prize points may be used to purchase an autographed baseball or a sports t-shirt. This is shown again, in general, in FIG. 15 and FIG. 16.

Team points are given to the group or crowd, itself, when playing as a group or crowd and reaching achievements or milestones. For example, let's assume the Mets' crowd team is the first crowd team to win 50 8-inning crowd games during the season, and for this achievement, they receive enough team points to win $1,000 in sustainable light bulbs for a local public school of its choice, donated to them by the game designer on behalf of the Mets' crowd team. In another example, Bar 123, representing the Mets team, plays Bar 124, representing the Yankees team, and the winner of this group vs. group match wins enough team points—paid by the other team's players—for participating team members at the winning bar to each have a beverage.

Bonus Points and Bonus Actions

In this game representation, there may be many ways to receive bonus reward points FIG. 17 that will be consistent with the rules of the game play's achievements, results and actions. Bonus reward points accumulate and translate, in a certain ratio, into game play currency to be used to purchase bonus actions. For example, if a player has 143 bonus points, the number of game play rewards points to use for bonus actions is 14 (assuming 10 bonus points for 1 bonus action point.)

In this game representation, there are three specific bonus actions that each player can select as additional wagers to score additional game play points FIG. 25: Double Down, RBI and Hunch.

In this game representation, both players can click on the "double down" button that will modify their outcome selection for the current batter to either win twice the game play points if the real play event is the same as what is selected, or to lose twice the prediction's penalty points if wrong. The cost of using "double down" is 3 bonus action points (assuming 10 bonus points for 1 bonus action point). In sum, for all bonus actions, if the selection outcome happens tied to the bonus action, then the player wins. If the play's outcome does not occur, the player receives the penalty points.

In this game representation, both players can click on the "RBI" button before any batted ball, but only after each player has made his or her play selection for the current batter and is based on a run being scored in the MLB real game being played. For the player at-bat, the player is rewarded when his or her team scores a run in this half-inning with more points scored when the selection is made with more outs. Contrarily, for the in-the-field player, the player is rewarded if the at-bat team does not score during the half-inning and reaps more points when the selection is made with zero outs. The cost of using "RBI" may be 1 bonus action point and the reward is 2 game play points if correct, yet a penalty of one game play point if incorrect. This feature, along with all bonus action options, are designed to keep both players more involved during the entire half-inning and the opportunity to root for your team, too.

In this game representation, both players can click on the "Hunch" button, a key aspect of the match-play game that can contribute to the potential of scoring game play points to be won for a particular predictive outcome by the batter. The cost of using "Hunch" may be 5 bonus action points. If the player is at-bat, the selection is to predict the exact type of hit, and when in-the-field, the player has to correctly predict the type of out and which fielder is involved. If correct, the player may receive a multiple of the number of points being wagered—from 7.5 points for a walk to 50 points for a home run.

The Game Play for One-Half Inning Between Two Individuals

In this same game representation, the game play is described for an individual versus individual match-play game. First, the game play starts when the top of the first inning of the live real game starts. Both players, based on the team they are each representing, make their selections electronically (e.g. using computer, tablet, smart phone, TV remote control device, and the like). Both player's selections are captured and optionally sent to the Game's central server STEP 214, but are locked in prior to the first pitch to the first batter. The pitcher throws the ball and there will be two potential results: 1) the umpire either calls a ball or strike, or in the case of a foul ball, a strike is assigned, or 2) the batter hits a fair ball and an official play outcome results.

If the former occurs, the pitcher will be sending a new pitch to the same batter (e.g. the pitch is not the $4^{th}$ called ball), both players can make changes to their selections before the next pitch is made. Selections are captured as defined above and optionally sent electronically to the Game's central server Step 214 where these revised selections replace selections previously made. This new entry is then locked in before the pitcher throws the next pitch.

In this example, the first batter is up for Player 1 and Player 1 selects a double to right field before the first pitch. The other player, Player 2, whose team is in-the-field, needs to select the type of hit or out that will occur before the first pitch and also to what fielder the ball will be hit. Player 2 selects a fly out to left field. The first pitch is a strike. Player 2 does not change his or her selections, but Player 1 changes his or her mind and adds a single to center as an additional selection. Both players have the opportunity to activate one of the bonus actions (such as double down), in exchange for bonus points, although if incorrect the player is subjected to a potential penalty fee. Neither player opts to use bonus points for a bonus action. On the $2^{nd}$ pitch, the batter flies out to the left fielder, generating an official play outcome to be scored for each player.

This play outcome, fly out to left fielder, is then compared to the selections of both players. Player 2 is correct. If there is a correct selection made, the central server looks up the points earned and provides these points to Player 2. If there is not a correct selection made or after points are distributed for a correct selection, the central server looks up the number of outs in the half-inning and if there are less than 3 outs, then the next batter is up and this process starts again but if this at-bat is the $3^{rd}$ out, then the half-inning is over and the new half-inning starts.

Another representation of a baseball game would include a mobile app screen of a 3rd party device where both opponents would use to make predictions, see what predictions were made, the scores of their own match-play games, and game information that both players can access during the game itself. In 2602, a player will be able to view at least one match-play game where the player is playing another player, and the game play points are updated after each play, in a scoreboard setting. 2604 presents the last full-inning score between the opponents who are playing in a crowd vs. crowd match-play game between the two real game teams. 2606 presents a player with access to real game statistics on players who are at bat and pitching, as well as the player's own statistics over the course of the multiple game season. In addition, two other items can be presented as part of the scorecard, the inning of the real game 2632 and an optional sponsor promotional logo 2630.

For each real play event, a player in the match-play game has to make selections based on the potential outcomes. 2610 are the elements a player in the field would select from when making predictions. These include, in this representation: fly out, pop up, ground out, double play, hit/walk, strike out, and other. 2612 are the elements a player at-bat would select from when making predictions. These elements include, in this representation: single, double, triple, home run, walk, out and other. A player makes selections by clicking on each individual element until all selections are made. Then, the player clicks on the Go button 2612 and the prediction is sent to the game's servers 206. Next, a player may decide to exercise one of more bonus actions. 2608 presents the bonus actions, in this case, double down, RBI and hunch that a player can select, each individually, after making his or her initial predictions. Each bonus action will cost a certain number of bonus points, which are displayed 2614 on the screen. Once a bonus action is selected, the bonus points number will drop by the attributed point cost.

A series of icons are presented at the bottom of this screen that provide access to information and navigation within the game. 2620 provides a player with access to his or her statistics, including information on their won-loss match-play record, their success rate in making predictions, various achievements and rewards points. 2622 provides access to a player's rewards program points and information about the rewards program and options for the player. 2624 showcases macro information about the leagues and scores of other games being played that include the player. Lastly, a player can go to the game's main menu that acts as the central game information center to help the player navigate through finding opponents, and answer all help questions.

Hockey
General Game Design Framework

Hockey is a sport that does not lend itself on first review, as well as baseball does, for being able to create a compelling prediction-based game with engaging match-play games if taking the same approach to creating the baseball game with its focus on predicting the easy to decipher hits or outs for each batter. For hockey this translates to a focus on goal scoring, and decisive results of plays after breaks in action or measurable play outcomes, such as if a team will score on a power play, or who wins a face-off. Hockey actions, plays and statistics are mostly fluid as there are very few breaks in the back and forth action of a game between two NHL clubs, and very few direct activities after a pause in action. Hockey action is also difficult to track due to the fast paced game, and the players rotate on ice throughout the game, often it is even difficult to know when a player is on the ice unless he is involved directly in the action. To create a compelling hockey game requires a different thought process. By following the game design strategy of first creating the competition module and then the games play module, the game designer, in this representation, has come up with the following game framework and match play game structure.

Hockey Game Representation #1
Competition Framework Module

Figure 27:
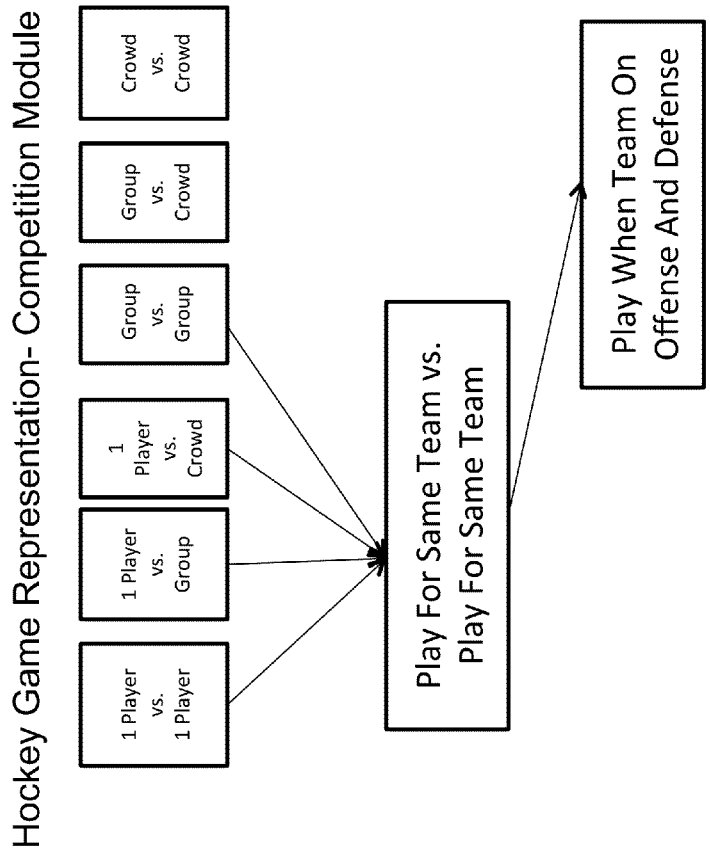
FIG. 27 depicts a hockey game representation of a competition module.

Hockey is a local fan-based sport, with an educated demographic of smaller base of fans, yet intensely loyal fans compared to other more popular sports of football, basketball and baseball. To emphasis this, TV ratings are not very high, easily 20% to 40% that of baseball, and are dwarfed by the popularity of football. Game attendance, however, equals the NBA at about 12 million for all the teams during a season. Therefore, the best configuration of match-play games is single player vs. single player, single player vs. group, group vs. group, and single player vs. the crowd 1002 with both matches against other fans of the same team 1004. Given its fluid play, it makes sense to have players focus on playing both offense and defense 1006. The competition module, in this representation of a game, can be viewed in FIG. 27.

Games Play Module

While it is hard to break down hockey to specific real play events, such as goals scored and face-offs, it is much easier to break down the game in specific chunks of game time. Predictions are based on what occurs within these specific periods of time. First, the match-play games between single players is a 10 minute game, either the first 10 minutes of a period, or the last 10 minutes, and each game is broken down into 5 minute segments, similar to an inning in baseball, or a two-inning hockey game to juxtapose baseball jargon on hockey as illustrated in FIG. 28. Therefore, there are 6 match-play games that can be played when watching an entire 3-period hockey game 1008. For crowd or group games, a match can be anywhere from 10 minutes to 1 period to 3 periods of length. 1010.

A sample of the elements to be used in predictions made by both players is illustrated in FIG. 29 and the predictions made are for the entire 5-minute segment, or for the time period that is left within each 5-minute segment when the prediction is made, especially for bonus actions selected. Examples of potential prediction elements include shots on goal, goals scored, goal scorer, shot blocker, any penalties, and face offs. Predictions may include these elements (A), as well as selecting the quantity of these elements occurring (B) within the 5-minute segment, and/or including specific players who perform them (C) FIG. 29. These selection choices can be molded into a prediction set that both teams can make—similar to being presented with a multiple choice questionnaire to complete before the start of each 5 minute segment 1014. For example, both players may be asked to predict how many shots on goal will be made by their team, and which specific players made them. For each prediction, the scoring can be based on the number of variables being included, as well as the likelihood of it occurring. For example, for shots on goal, in FIG. 30, the player can select a set number of shots on goal, or a range of shots and receive more points for the former being selected and correct, than the latter. Also, the selection of players could be "all 3 players, X, Y and Z" have shots on goal, or 1 of the following 5 players have a shot on goal or any 2 of these 6 players" and points for each are attributed to the probability and variables included for each element/prediction. The scoring for each match-play game is based on a differential in game play points earned by both players at the end of each 5-minute segment. If the differential is greater, for example, than 10 points, this equates to scoring 1 goal for a player, and 20 points could equal 2 goals scored during this segment. If the differential is less than 10 points, then no player scored. For crowd and group scoring, all players who play for each group or crowd will have their points normalized, as described above, for these 5-minute segments of whichever match-play game being played FIG. 10.

Rewards Module and Bonus Points/Actions

The rewards module is to be set up for prize points, bonus points and team points using the input forms provided to the game designer. How bonus points can be translated into bonus actions, and exactly what are the bonus actions is an important part of the game play for hockey and center around the prediction of goals being scored by both teams, and how this impacts the match-play games as part of the prediction set. One prediction is goals scored by either real game team during the 5-minute segment. Players can use bonus points to trigger bonus actions that can enhance the points scored when accurately predicting when a goal is scored by their team, or also when a goal is not scored by the real game's opponent.

For Football

General Game Design Framework

Like baseball and the defined battle between pitcher and batter, the game of football has a defined play between the entire offense of one team, when the quarterback snaps the ball, and the entire defense of the other team. In addition, there is a clear break between football plays that allows match-play game players to easily make predictions about each upcoming play. The resulting play outcome and statistics can be readily collected in "real-time" after each play, too. This information can be communicated electronically in real-time to make the match play structured around the actual play in the live football game. One difference between baseball and football, however, needs to be understood by the game designer. The pace of baseball is leisurely and there is plenty of time for fans to make their selections. The pace of each play within a football game is much faster; often within 30 seconds after the last play ends. Plus, the situation in the game often dictates the type of play call and result that the player is attempting to predict. Therefore, the match-play player, whether on offense or defense, may feel rushed and, rather than feel enjoyment, the player feels like predicting each play is a never-ending chore. Therefore, for this game representation, the game designer will have two players play as a team in the player vs. player matches (becoming two player team vs. two player team) where one player for each team makes offense predictions and the other player for each team makes defense predictions.

A play starts when the quarterback, punter or kicker snaps the football and ends with an outcome shortly thereafter. After the end of the play, the game system uses its software program and its central server to compare both players' selections with the official outcome of the play. The game system then cross-references the correct selections to find the amount of points scored and gives these points to each player, as earned.

In general, both players score points when their selections are correct and lose points when incorrect due to penalty fees, based on the rules being played. The Game keeps track of these points for each player accumulated over a period of game play, and for the entire game, if applicable.

Football Game Representation #1
Competition Framework Module

Figure 31:
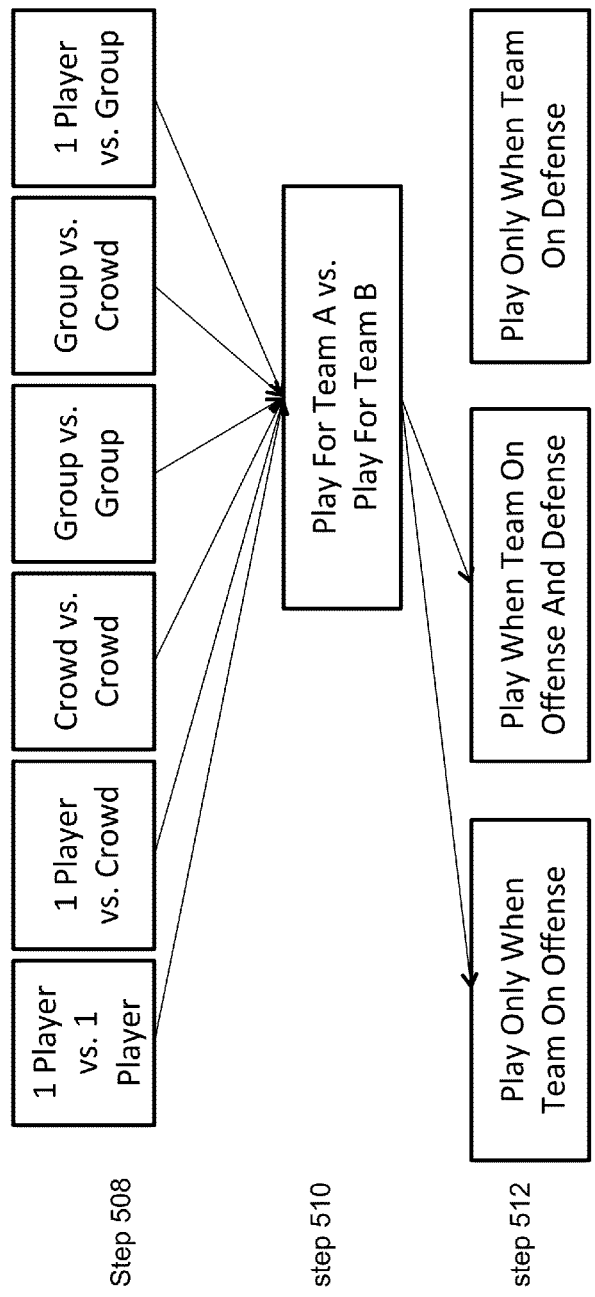
FIG. 31 depicts a football game representation of a competition module.

FIG. 31 illustrates the selections made by a game designer based on the three steps of the competition module. First, as each NFL or college football game is viewed by die-hard fans from both teams throughout the country usually by TV broadcast, the match-play competitions can support player, group and crowd variations. For example, group vs. group can be viewed as bar vs. bar in opposing team cities. The game could easily support match-play between same teams, but with such strong fan intensity, the game designer, in this representation, decides to structure match-games where one team plays the other team, exactly like the live football game. Last, similar to baseball, the predictions that a player makes when on offense are different than the ones when made on defense, and the match-play game may take place for players on every play, whether their teams are playing offense or defense.

Games Play Module

The game takes place between two opponents when watching or listening to a live football game, where one opponent represents the home team and the other represents the visitor team. The match-play game occurs simultaneously with the live football game and centers around each play of the live game and how both match-play game opponents make selections, prior to the play, as to the outcome of the play in real-time. For each play, one opponent represents the offense (OP) and the other opponent represents the defense (DP). There is not the option for either player to switch the prediction, except if a penalty occurs in the real game and the down is replayed.

In FIG. 32, the match-play game is played by breaking up the real game into two or four sections. A match-play game can occur for the $1^{st}$ and $2^{nd}$ quarters of the real game (2 sections), or the $3^{rd}$ and $4^{th}$ quarters, or for all 4 quarters (4 sections). The game could be broken up into two sections of a quarter, but, for this representation, this is not selected. In this representation, for each play, the OP, in FIG. 33, can select from multiple choices from one or more of the following categories to make a prediction for the real game's offense on the field based on 4 key variables: 1) the play outcome 2802; 2) the position player doing the outcome 3304; 3) the number of yards gained or lost 3306 and 4) the direction of the play to the left, center or right side of the field 3308. For this representation, the offense player needs to select all three elements—an outcome 3302, the number of yards 3308 and the direction of the play 3308—to make a valid prediction selection.

For each play, in FIG. 34, the DP can select from multiple choices from one or more of the following categories to make a prediction: 1) the play outcome 3402; 2) the position player doing the outcome 3404 and 3) the number of yards gained or lost 3406 and 4) the direction of the play to the left, center or right side of the field 3408. The prediction can be any combination of these 4 categories, depending on the rules of the match-play game being used. For this representation, the defense player needs to only select two elements—an outcome 3402 and the number of yards 3406—to make a valid prediction selection.

This process, described above for snaps by the quarterback, can also be applied to both the OP and DP for punts, field goals and kickoffs as demonstrated by the list of potential selections that may take place for each real play event in FIG. 35.

Figure 36:
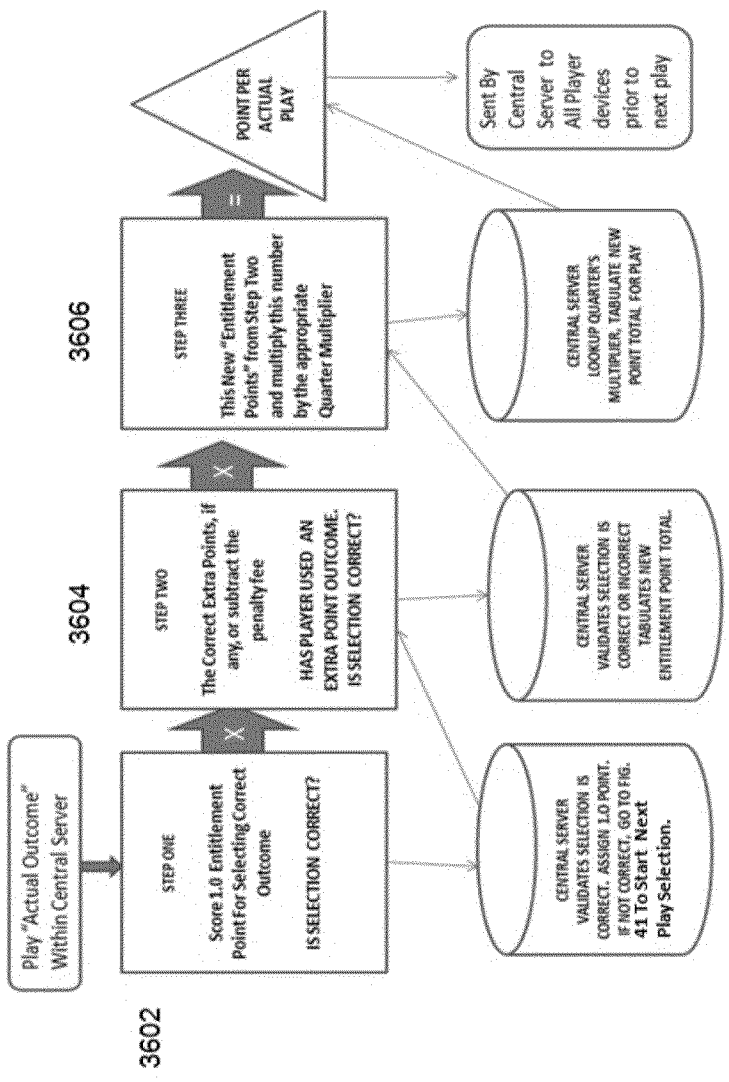
FIG. 36 depicts a football game representation of a 3-step process for scoring for each prediction play.
Figure 38:
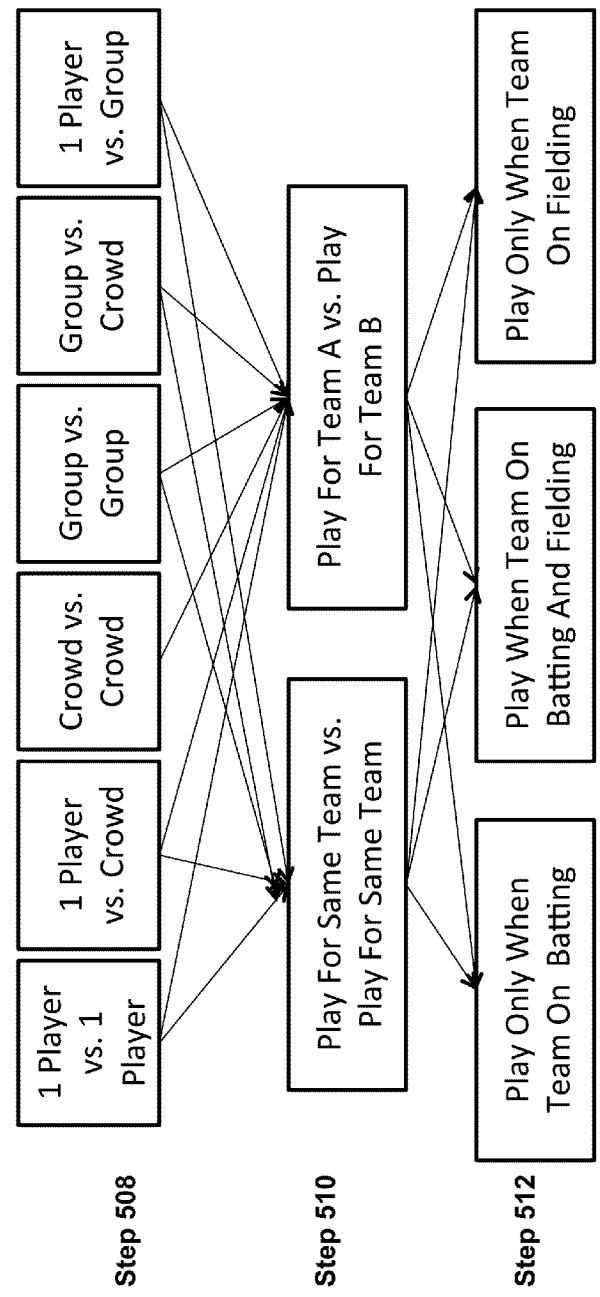
FIG. 38 depicts a cricket match representation of a competition module.

In FIG. 36, in this representation, both the OP and DP can score points for each play's outcome by correctly selecting the combination of their "action" choices that exactly fits the "actual outcome" play result. For this game, the game designer has created a three-step process for assigning the proper points for each correctly predicted play for both players. It involves the central server 206, programmed with the rules/points system being used, and it's back and forth interactions with the computer, tablet, smart phone and/or TV remote being used by each player.

In Step 3602, a player receives one game play point (called an "entitlement" point for the purposes of this example) if correct. For example, a wide receiver catches a pass for a 12-yard gain to the left side of the field. The OP had selected a completed pass to the wide receiver between 10-20 yards, to the left side of the field (left of left hash-mark on the field). As the actual result equals the predicted result, the OP player earns one "entitlement" point. The DP, for this play, had selected a running play and was incorrect and received no points for this play.

In Step 3604, players have the opportunity to score more points if they use their bonus points to activate bonus actions (also called "extra points" in this example), such as double down, and as generally described in FIG. 17. For this representation, both players could have selected a "bonus action" option prior to the specific play. If one or both players were correct with their bonus action selection, the central server would award additional points to this player, based on which bonus action(s) was selected. Alternatively, a successful bonus action could cancel out all points awarded to the OP if the DP blocked the play as use of a bonus action. If the play prediction is incorrect, a penalty fee may be assessed to the player(s) who selected a bonus action option.

In Step 3606, the game system would add up the initial entitlement point and these extra points, if applicable, and then multiply this amount by an additional feature of the game called a play multiplier. At the start of each quarter, the Game randomly assigns a play multiplier for the QB, running back, wide receiver and kicker-all the possible position players who can be performing the outcome. This per position multiplier is viewed by both players and can range from 1.0 (no change) to 2.0 (in 0.1 increments). Both players see these quarter-by-quarter multiplier numbers next to each position prior to the first snap of each section, and this number is used as the multiplier used by the central computer to assign the proper points. For example, if on a play where the OP correctly selects the outcome, and it includes the wide receiver (with a 1.3× multiplier for that quarter), the OP player receives 1 point from Step 1. If the player had selected double down, as the bonus action, he or she would have received twice the points, 2.0 points for the play after Step 3604. This amount would then be multiplied by this 1.3 points for the player to score 2.6 game play points for this play.

In another representation, a game designer could assess the right number of points to award, not by this 3-step process, but by assigning probabilities to the various potential selection categories and awarding points, accordingly. For example, a player may select one choice, such as "a run" and score two game play points, or two choices, such as a "run that is 0-5 yards" that would score 4 game play points, or three choices, such as a "run that is 0-5 yards to the left side of the field" would score 8 game play points.

The match play scoring between two opponents, for this representation, is for all the plays in a match-play game. It mimics the way football games are scored where a touchdown is 7 points and a field goal is 3 points. A player can score these game play points only when on offense. During the first section of a two-section game, either player can convert a marginal lead (which is the difference in entitlement points scored by both opponents) of a set number of these points, say 10, into a Field Goal (3 game play points), or convert a marginal lead of a set number of points, say 20, into a touchdown (7 game play points). At the start of the second section, the game reverts back to a 0 marginal score differential (essentially 0 to 0). For example, using the previous conversion points at 10 and 20 for a field goal or touchdown, respectively, one player in this two section game is leading 15 points to 4 points (a marginal difference of 11 points) and there is 1.15 minutes left in the first section (the first quarter in the real game) and it's first down and this player is on offense. The player can claim a field goal and gain 3 game play points (as this player has a higher marginal difference than 10), before the start of this first down play or anytime before the $4^{th}$ down play starts in the live game as long as the differential is at least 10, or this player can try to expand his or her "entitlement" point differential to 20 in order to score a touchdown, 7 points, before the last 1:15 of the real game's quarter ends. If the real game's quarter ends or the player's real game's team has a turnover or scores a touchdown before the player can convert his or her game entitlement points as the OP, then no game play points are awarded. For the 4-section game, this same end of section process is at half time and the end of the $4^{th}$ quarter in the real game. For both games, once points are converted by a player, the game reverts back to a 0 marginal score differential (essentially 0 to 0). In this conversion points game, the player who scores the most game play points at the end of the two section game or the entire game is the winner.

For match-play games involving the crowd or group, in this representation, this conversion points method can be used if points are normalized for all players on a team or if the "wisdom of the crowd" point program is used. In both cases, certain rules exist where a coach has to be established for the group or crowd in order to decide when to claim a field goal or go for a touchdown. How this occurs would be different for each match-play game system being developed.

In another representation, the game between two opponents can be scored based on cumulative points earned for each play. This would be valid where one player plays another play, or when groups or crowd teams are involved and their scores are normalized over the number of players playing for them, and this score per play number used as the game play points scored that can be compared to whomever the opponent is.

Rewards Module and Bonus Points/Bonus Actions

The rewards module is to be set up for prize points, bonus points and team points using the input forms provided to the game designer. How bonus points can be translated into bonus actions, and exactly what are the bonus actions is an important part of the game play for football as described in the football exemplary game play module described herein. Players can use bonus points to trigger bonus actions that can be used to enhance the game play points scored.

For Cricket

General Game Design Framework

Like baseball and the defined battle between pitcher and batter, the game of cricket has a defined play between the batsman and the bowler. In addition, there is a clear break between plays that allows match-play game players to easily make predictions about each upcoming play. The resulting play outcome and statistics can be readily collected in "real-time" after each play, too. This information can be communicated electronically in real-time to make the match play structured around the actual play in the live cricket match. While India, as a developing nation, has periodic power blackouts, and may not have the current broadband or mobile connectivity as does a developed nation, such as the United States, it is assumed that, as time progresses, more and more of their country will be wired and connectivity will improve to make "100% real-time" internet, mobile and Wi-Fi, communications between the cricket fan-base and the computer servers of the game a viable and engaging experience. Cricket is also played in developed countries, such as England and Australia, where this connectivity exists.

The game takes place between two opponents while watching or listening to a live cricket game, where during each half-inning of the game one player (Fielding team player—FTP) represents the fielder side ("FTP") and the other opponent (Batting team player—BTP) represents the batting side ("BTP"). The match-play game occurs simultaneously with the live cricket game. FIG. 32 shows how FTPs and BTPs are set up, as examples of this game, for Test Match Cricket 3702, One Day International Cricket 3704, and Twenty 20 Cricket. New batsman in the real game are the new batsman in the live cricket game and players switch from FTP and BTP roles based on when the live cricket game teams end innings. The real game is centered on each batsman's play in the live game and how both match-play game players make selections as to the outcome of the batsman's play in real-time. Players use either a computer, tablet, smart phone and/or TV remote control device to enter, by keyboard or by touch screen, one or more selections that are transmitted back to the application's central server, before the ball is bowled to the Batsman In general, both players score points when their selections are correct and when incorrect they lose points due to penalty fees, based on the rules being played. The player with the most points at the end of the match-play game wins. The match-play game can be played at the cricket stadium where the live cricket game is being played or watching a real game live by computer, tablet, smart phone or TV, as well as listening to the game on radio. The match-play game can also be played using pen and paper by watching or listening to the game live and manually scoring each at-bat and referring to the official outcome point scoring sheet.

Cricket Match Representation #1

Competition Framework Module

FIG. 33 illustrates the selections made by a game designer based on the three steps of the competition module 502, 504, 506. First, as cricket is very popular in countries where it is played, including the new India Premier League by fans representing both teams throughout the country, the match-play competitions can support all variations of match-play games, including match-play games where opponents play for the same team, as well as playing for opposing teams. As this game representation is targeted to be used when watching the India Premier League, other professional cricket leagues and international competitions, the game designer wants to keep as many options open as possible to see which match-play games catch on and gain popularity. Last, similar to baseball, the predictions that a player makes when on offense are different than the ones made on defense, and the match-play game may take place for both opponents on every play, when their teams are playing offense or defense.

Games Play Module

The real game is played for 20 Overs each innings for T20 matches, 50 Overs each innings in one-day international matches and for 5 days in case of a Test match. For this representation, the match-play game will be split into smaller sub-games, for example, 4 Overs, whereas the crowd game will be the same length of the real game being played. For each match-play game, Player 1 starts as the BTP, represents the visiting team, and is the Batsman (BTP) and Player 2 starts as the FTP, represents the home team, and is in the field. The two opponents mimic their respective teams for each half-inning when their live team comes to bat or is in the field.

For each new inning, both BTP and FTP need to make their selections (FIG. 39 and FIG. 40 respectively) before the ball is bowled to the batsman in the play of the live cricket game. For the BTP in FIG. 39, for each batsman, the BTP can only select where the ball will be hit 3904 and the type of hit outcome 3902. For the FTP, for each batsman, the FTP will select where the ball will be hit to a fielder or the boundary 4002 and the "Out or Hit" outcome, whether the ball will be hit, defended or out 4004.

Figure 41:
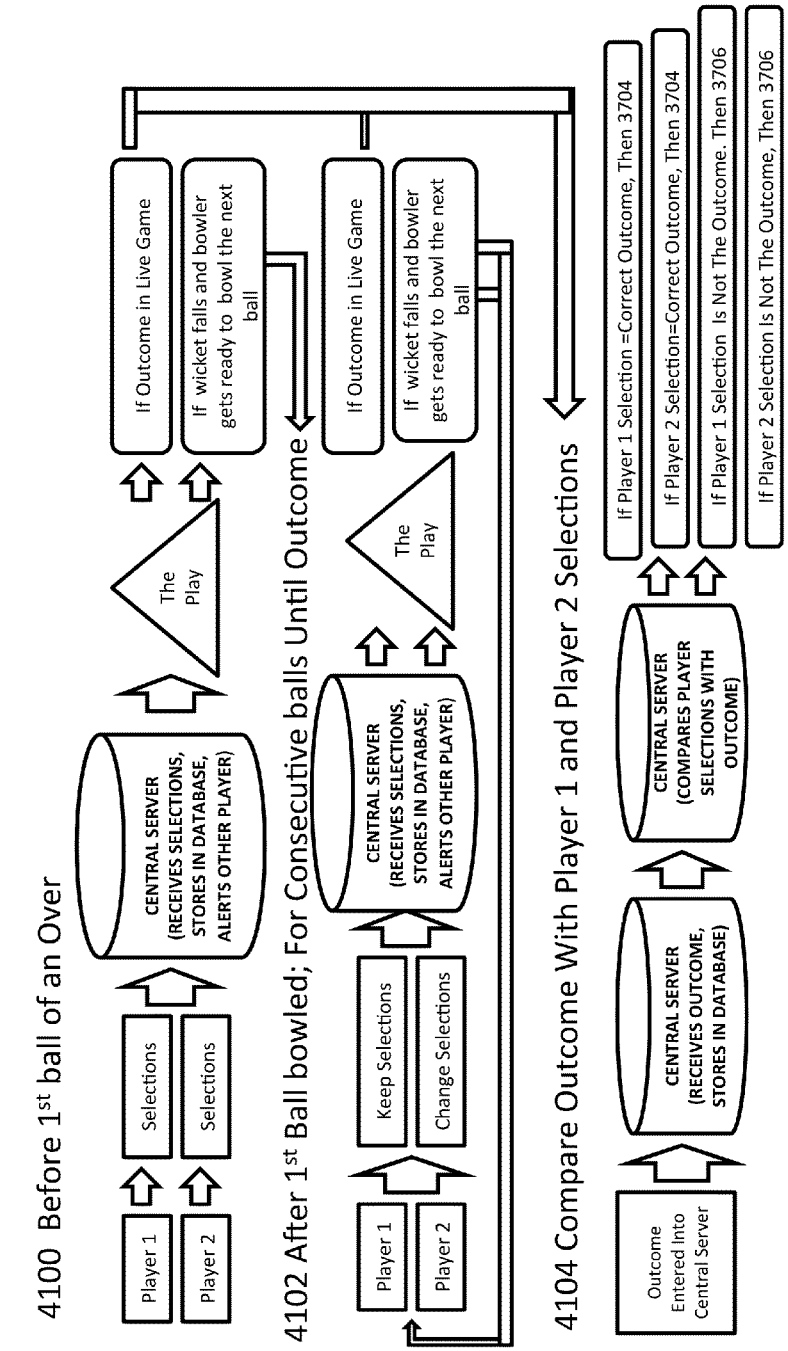
FIG. 41 depicts a cricket match representation depicting result handling: part one.

Each player may receive the selections the other player made, to assist the other player in deciding to switch selections or use bonus actions. As shown in FIG. 41, during the live time between consecutive balls, both players may make changes by keying in new selections, using the same entry process on computer, tablet, smart phone and/or TV remote control device that take precedence over previous ones 4102. After every Over the outcome is sent to the control server. At this point, the game system uses its software program and its central server to compare both players' selections with the official outcome of the play 4104. The game system then cross-references the correct selections to find the amount of points scored and gives these points to each player, as earned 4202. The game system keeps track of these points for each player cumulated over the each match-play game, as well as for an entire real game as a player always plays for his or her crowd team.

In games where a group or a crowd is involved as one of the opponents in a match-play game, the scoring system for group and crowd selections are to be normalized, in this match representation, by adding up all points of the players in the group or crowd, and then dividing by the number of participating players for the same group or crowd. This normalization scoring process when used for crowd vs. crowd may also, in the same match, be used for any match-play contest involving a group.

In another representation of a match-play game when a crowd or group is involved, the game design could include "wisdom of crowd" selections as a group or crowd's predictive outcome. Rather than be based on normalizing the cumulative points from all players for their individual game play, these predictive selections by the crowd could be made based on the most popular selections of a crowd or group team, i.e. all the members of a team's players. If, for example, 2019 people playing in the field for the Bangalore Royal Challengers team selected "Bowled Out, Ball Hit To Cover" as the top combination made, and 2018 people selected "Caught Out, Ball Hit to Point", then the former would be the selection by the Bangalore crowd team in its crowd vs. crowd match as it received the most selections, i.e. "votes."

The match play scoring between two opponents, for this representation, is for all the plays in a match-play game. Points (i.e. runs) are cumulative and totaled at the designated end of the match play game or after the real cricket game is completed for the crowd vs. crowd match-play game. For illustrative purposes, game play points in each match-play game are assigned for each action outcome combination for FTP and BTP players and occur for each batsman, in any number of combinations of the following choices, each with specific probabilities of occurrence. Most similar to baseball, the game designer can assign points for a player who selects multiple play outcomes, i.e. the win-place-show scoring method.

These game play points for a play are then added to additional points received for correct bonus actions, if any, and, added together, this total is then multiplied by the position-based inning multiplier. At the start of each inning, the game randomly assigns a multiplier, as shown in the example in FIG. 43, for each of the position players (i.e. where a ball can be hit). The multiplier can be viewed by the BTP and FTP and can range from 1.0 (no change) to 2.0 (in 0.1 increments). Both BTP and FTP see these inning multiplier numbers next to each position prior to the first ball of the inning, and they are the same for the entire inning. For example, if the FTP selects Caught by Wicket keeper (with a 1.3× multiplier) and Caught by Wicket keeper is the actual play outcome, the player receives X points, for being correct, multiplied by this 1.3 points.

Rewards Module and Bonus Points/Bonus Actions

The rewards module is to be set up for prize points, bonus points and team points using the input forms provided to the game designer. How bonus points can be translated into bonus actions, and exactly what are the bonus actions is an important part of the game play for cricket. Players can use bonus points to trigger bonus actions that can used to enhance the points scored. As cricket is similar to baseball, the same baseball bonus actions, double down, RBI and hunch may be used within the game play and each of these bonus actions will have appropriate costs associated in bonus points to use.

How the Game and Players Interact for One Batsman

In FIG. 44, at the beginning of the inning, Player 1 is on the batting side and is the BTP. Before the first ball, the BTP needs to select the type of hit outcome 3902 and to what fielder the ball is going to be hit 3904. Player 1 selects a '2 runs towards Long ON', looking at the inning multiplier FIG. 43. The FTP is Player 2 and needs to select before the first ball both the outcome of the batsman and also to what fielder the ball will be hit to. He or she takes into consideration the choices for the inning multiplier FIG. 44. Player 2 selects a Run Out by Third man. The match-play game's computer processor reviews both selections from Players 1 and 2 4100. The outcome for Player 1 as BTP does not match the actual results of the play. Player 2, as FTP, however does predict the actual outcome and is correct. As the inning multiplier for Third man is 1.5, therefore, Player 2 as FTP is awarded X points multiplied by 1.5.

Playing One Inning Between Two Players

Figure 42:
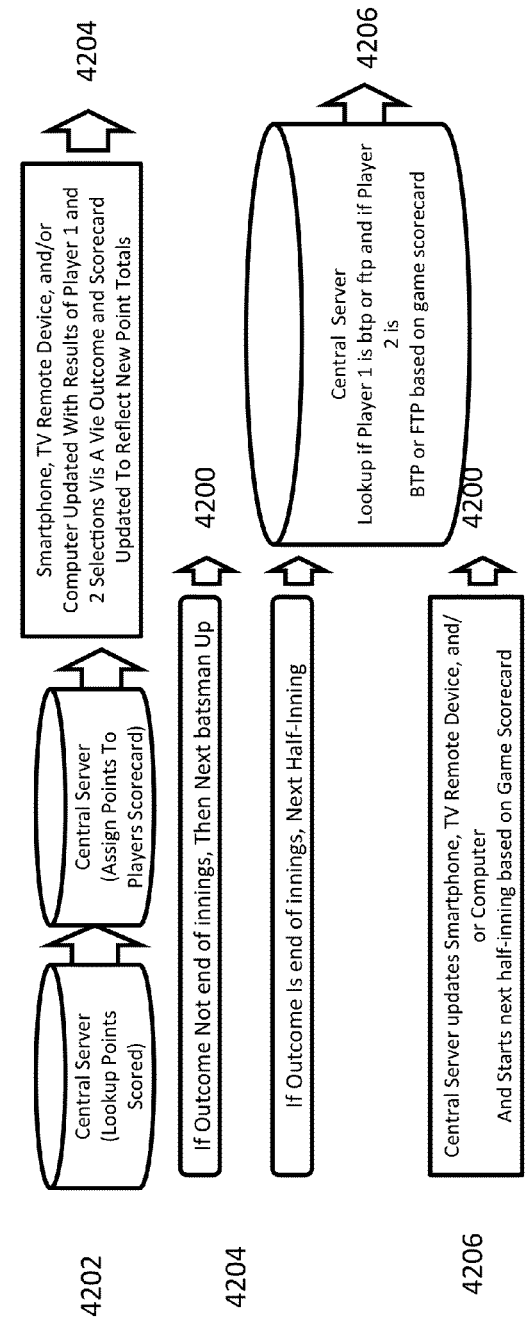
FIG. 42 depicts a cricket match representation depicting result handling: part two.

The below example showcases one inning played between two individual players, without the scoring for each player. Before the match-play game starts, both players receive the match-play games rules book and associated points for the BTP and FTP, including penalty points for incorrect selections, as warranted per the rules. Without going into a detailed analysis of each batsman and the selections made by the FTP and the BTP during each inning, we will discuss how the match-play game's software application engine works through the flowchart in FIG. 41 and FIG. 42:

The top of the inning starts. Both players, representing the BTP and FTP, make their selections using computer, tablet, smartphone and/or TV remote control device. The selections must be sent to the game's central server and are locked in prior to the first ball to the new batsman 4100. The bowler bowls the ball and three potential results: 1) The ball is defended with no runs scored; 2) Runs are scored by placing the ball; or 3) The Batsman gets out 4104.

Before the play outcome occurs, however, players can reselect their selections in case there is change of strategy like the power play, change of bowling end before the ball is bowled 4102. Selections are sent from a player's mobile phone or within a player's laptop or desktop computer's internet browser or TV set top box to the Game's central server where these revised selections replace selections previously made and this new entry is locked in before the next ball is bowled. Changes can be made without a penalty fee assessment if at least one of their revised selection(s) is correct. Both players have the opportunity to use their bonus points in exchange for bonus action selections, such as double down for the opportunity to secure additional points on the play before the batsman's outcome occurs, although if incorrect the player is subjected to a potential penalty fee.

Once the results for a batsman occur, the outcome is compared to the selections of both BTP and FTP 4104. If there is a correct selection made, the central server looks up the points earned and provides these points to the appropriate players 4202. This process repeats itself until the inning is over and the last over occurs 4204 or 4206.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A method of developing a match-play game in which an outcome of a live event determines an outcome within the match-play game, comprising:
   i) determining a first set of outcomes that may occur in the live event;
   ii) presenting the first set of outcomes to a game designer;
   iii) presenting a design interface in which a game designer may create a match-play game that is accessible by a plurality of users located remotely from the live event;
   iv) enabling a user of the plurality of users to determine at least one outcome from the first set of outcomes in coordination with a specific real play action in the live event so that the determined outcome is based on real-time context of the live event as an outcome in the match-play game; and
   v) enabling the user to associate in real-time the at least one outcome in the match-play game to the specific real play action that produces an outcome in the live event.

2. The method of claim 1, further comprising, providing the user with a probability of occurrence of an outcome in the live event, such that the associating of an outcome in the match-play game to an outcome of the live event may be based on the probability of occurrence of the outcome in the live event.

3. The method of claim 1, further comprising, providing the user with a point value for an outcome in the live event, such that the associating of an outcome in the match-play game to an outcome of the live event may be based on the point value of the outcome in the live event.

4. The method of claim 1, wherein enabling a user to associate at least one outcome in the match-play game to an outcome in the live event includes enabling the user to predict at least one outcome of the live event.

5. The method of claim 4, wherein enabling the user to predict at least one outcome of the live event includes enabling the user to predict at least one measureable action of at least one real play event of the live event.

6. The method of claim 1, wherein the live event is a live sports event.

7. The method of claim 6, wherein the live sports event is selected from a list consisting of football, baseball, hockey, and cricket.

8. The method of claim 1, further including enabling the user to associate a plurality of outcomes in the match-play game to a plurality of time-separated outcomes in the live event.

9. A method of developing a match-play game in which competing player predictions of a live event outcome determines a match-play winner within the match-play game, comprising:
   i) determining at least two sets of outcomes that may occur in the live event;
   ii) presenting the at least two sets of outcomes to a game designer;
   iii) presenting a design interface in which a game designer may create a match-play game for at least two competing players;
   iv) enabling each competing player to select one or more outcomes for an outcome producing action in the live event, the enabling coordinated with the outcome producing action and the outcomes selected from the at least two sets of outcomes that may occur in the live event as a result of the outcome producing action, the selection producing player-specific outcome predictions in the match-play game, wherein each competing player selects from a different set of outcomes; and
   v) enabling determination of a match-play performance for each competing player based on comparison of each player-specific outcome prediction with actual outcomes of the live event.

10. The method of claim 9, wherein a first set of outcomes of the at least two sets of outcomes that may occur in the live event is an offensive set of outcomes and a second set of outcomes of the at least two sets of outcomes that may occur in the live event is a defensive set of outcomes.

11. The method of claim 9, wherein determining match-play performance comprises determining separately for each competing player a match-play result of one of win, lose, and tie.

12. The method of claim 9, wherein the live event is a live sports event.

13. The method of claim 12, wherein the live sports event is selected from a list consisting of football, baseball, hockey, and cricket.

14. A method of game design of crowd versus crowd competitive match-play games based on predicting an outcome of a live sports event, comprising:

i) configuring a competition module to enable crowd versus crowd match-play in a game in which a real-time outcome of a live event outcome producing action determines a corresponding time-coordinated outcome within the match-play game;

ii) configuring a game match-play module to support crowd versus crowd match-play, wherein a crowd comprises at least one player;

iii) configuring a rewards module for determining player and crowd match-play performance, wherein match-play performance is based on accuracy of player prediction of real-time outcomes of the outcome producing action of the live event, wherein the player match-play prediction is coordinated with the live event outcome producing action; and iv) configuring a rewards determination module for allocating rewards based on player and crowd match-play performance.

15. The method of claim 14, wherein the live sports event is selected from a list consisting of football, baseball, hockey, and cricket.

16. The method of claim 14, wherein crowd match-play performance is based on normalized player match-play performance across all player predictions for each crowd.

17. The method of claim 16, wherein a winner of the match-play game is based on the crowd match-play performance.

18. The method of claim 14, wherein crowd match-play performance is based on comparing a crowd favorite predicted outcome to an outcome of the live event.

19. The method of claim 18, wherein the crowd favorite predicted outcome is the outcome that is predicted most frequently among players in the crowd.

20. The method of claim 18, wherein a winner of the match-play game is based on the crowd match-play performance.

* * * * *